(12) United States Patent
Sasaki

(10) Patent No.: US 6,210,544 B1
(45) Date of Patent: *Apr. 3, 2001

(54) MAGNETIC FILM FORMING METHOD

(75) Inventor: Yoshito Sasaki, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,163

(22) Filed: Feb. 1, 2000

Related U.S. Application Data

(63) Continuation-in-part of application No. 09/264,839, filed on Mar. 8, 1999, now Pat. No. 6,036,825.

(51) Int. Cl.$^7$ .................................................. H01F 10/00
(52) U.S. Cl. .................. 204/192.2; 204/192.11; 204/192.12; 204/192.15; 204/192.22; 427/566; 427/571; 427/576; 427/580; 427/599; 428/692; 428/694 T
(58) Field of Search ............................ 204/192.2, 192.11, 204/192.15, 192.22, 192.12; 428/692, 694 T; 427/566, 576, 571, 580, 599

(56) References Cited

U.S. PATENT DOCUMENTS

| | | |
|---|---|---|
| 4,865,658 | 9/1989 | Kudo . |
| 5,302,469 | 4/1994 | Sugenoya et al. . |
| 5,573,863 | 11/1996 | Hayakawa et al. . |
| 5,750,273 | 5/1998 | Inoue et al. . |
| 5,837,392 | 11/1998 | Katori et al. . |
| 6,036,825 | * 3/2000 | Umetsu et al. . |

FOREIGN PATENT DOCUMENTS 6-248445    2/1993   (JP) .

OTHER PUBLICATIONS

Ahn et al., IBM Technical Disclosure Bulletin S1508, vol. 13, No. 10, (no date avail.).

* cited by examiner

*Primary Examiner*—Bernard Pianalto
(74) *Attorney, Agent, or Firm*—Brinks Hofer Gilson & Lione

(57) ABSTRACT

Disclosed is a magnetic film forming method of forming a magnetic film on a substrate by preparing a material A formed of oxide of an element T of at least one kind of Fe, Co, and Ni and a material B formed of oxide of an element M of at least one kind selected from Ti, Zr, Hf, Nb, Ta, Cr, Mo, Si, P, C, W, B, Al, Ga, Ge, and rare earth elements and making a target by sintering the powders of the material A and the material B or preparing the material A formed of oxide of the element T of at least one kind of Fe, Co, and Ni, the material B formed of oxide of the element M of at least one kind selected from Ti, Zr, Hf, Nb, Ta, Cr, Mo, Si, P, C, W, B, Al, Ga, Ge, and rare earth elements and a material C formed of an element S of at least one kind of Fe, Co, and Ni and making a target by sintering the powders of the material A, the material B and the material C; disposing the target in a film forming apparatus so that the target confronts a substrate; and forming the magnetic film on the substrate.

30 Claims, 12 Drawing Sheets

MAGNETIC FILM FORMING METHOD

This application is a continuation-in-part of U.S. Ser. No. 09/264,839 filed Mar. 8, 1999, now U.S. Pat. No. 6,036,825.

BACKGROUND OF THE INVENTION

1. Field of the Invention

The present invention relates to a magnetic film used as, for example, the core layer of a thin film magnetic head, and more specifically, to a magnetic film forming method capable of forming a magnetic film excellent in magnetic characteristics by improving the material of a target used in a film forming apparatus.

2. Description of the Related Art

A soft magnetic material used as the core layer of the writing head of a thin film magnetic head, that is, the core layer of a so-called inductive head and a soft magnetic material used as the magnetic film (magnetic core) of a flat type magnetic element such as an inductor and the like are required to exhibit a high magnetic permeability, a high saturation flux density and a high specific resistance and have a low coercive force in a high frequency region.

Japanese Unexamined Patent Publication No. 6-316748 proposes a Fe-M-O alloy as a soft magnetic material excellent in the high frequency characteristics, where an element M is a rare earth element and elements such as Ti, Zr, Hf, V, Nb, Ta, W in the Groups IVA, VA and VI in the periodic table.

Table 1 of the publication shows the magnetic characteristics of a plurality of Fe-M-O alloys which have a different composition ratio and in which the element M is formed of Hf and the like.

It is preferable that a high frequency magnetic material has a high saturation flux density Bs, a high specific resistance $\Sigma$, a high magnetic permeability $\mu$ and a low coercive force Hc.

Among the magnetic materials shown in Table 1 of U.S. Pat. No. 5,573,863, one of the high frequency soft magnetic materials which is particularly excellently used for high frequency is a $Fe_{54.9}Hf_{11.0}O_{34.1}$ film.

A noticeable point of this magnetic film is that the ratio of O in the oxide comprising Hf and O is larger than the stoichimetrical value of 1:2 in $HfO_2$. A specific resistance can be increased by increasing the composition ratio of O.

Incidentally, the Fe-M-O alloy film is formed by sputtering and vapor deposition. Any of existing sputtering apparatuses such as an RF 2-pole sputtering apparatus, a DC sputtering apparatus, a magnetron sputtering apparatus, an RF 3-pole sputtering apparatus, an ion beam sputtering apparatus, a confronting target type sputtering apparatus and the like may be used as a sputtering apparatus.

As described above, a large amount of oxygen must be contained in the Fe-M-O alloy film to improve the specific resistance ρ thereof.

Reactive sputtering can be exemplified as a method of adding oxygen (O) to the magnetic film.

In the reactive sputtering, a Fe—Hf alloy, for example, is used for a target and sputtering is performed in an $(Ar+O_2)$ mixed gas atmosphere in which an $O_2$ gas is mixed with an inert gas such as Ar or the like.

With this operation, Hf is bonded to active O and the composition ratio of O contained in the magnetic film can be increased or decreased by adjusting the flow rate of the $O_2$ gas.

However, there is a problem in the reactive sputtering that it is very difficult to properly control the flow rate of the $O_2$ gas and the reproducibility (stability) of a formed film is bad.

Further, there is also a method of using, for example, a magnetron sputtering apparatus and sputtering a composite type target which uses a plurality of chips comprising $HfO_2$ to a Fe target in an Ar atmosphere, in addition to the aforesaid reactive sputtering.

In this case, a method of adjusting the composition ratio of the Fe—Hf—O alloy film is to change the number of the $HfO_2$ chips. That is, when it is desired to increase the composition ratio of O, it is sufficient only to increase the number of the $HfO_2$ chips.

Although the composition ratio of O is increased by increasing the number of the $HfO_2$ chips, the composition ratio of Hf is increased at the same time and the composition ratio of Fe is abruptly decreased. As a result, there arises a problem that the saturation flux density Bs which greatly depends on the composition ratio of Fe is reduced.

When the composition ratio of the $Fe_{54.9}Hf11.0O_{34.1}$ film which is excellent in the soft magnetic characteristics is examined, it can be found that the composition ratio of O is about 3 times that of Hf.

However, even if the Fe—Hf—O film is formed using the above composite type target, the composition ratio of O is not made about three times as large as that of Hf.

This is because that since $HfO_2$ is used as the chip material, the composition ratio of O is originally only twice that of Hf and accordingly the ratio of Hf to O of the Fe—Hf—O alloy film having been formed cannot be made to about 1:3.

As described above, the reactive sputtering is bad in the reproducibility (stability) of a formed film. Further, a magnetic film having a composition ratio at which all the magnetic characteristics can be made good cannot be formed by a target using an oxidizing agent comprising Fe and Hf.

SUMMARY OF THE INVENTION

An object of the present invention for solving the above problem is to provide a magnetic film forming method capable of properly adjusting the composition ratio of a magnetic film and forming a magnetic film excellent in reproducibility (stability).

Prior to the description of the present invention, the invention of U.S. Ser. No. 09/264,839 as an original application will be first described.

The invention of the original application is a magnetic film forming method of forming a magnetic film mainly containing one kind or two or more kinds of elements of Fe, Co, Ni, one kind or two or more kinds of elements M selected from Ti, Zr, Hf, Nb, Ta, Cr, Mo, Si, P, C, W, B, Al, Ga, Ge, and rare earth elements, and O by disposing a target and a substrate confronting the target in a film forming apparatus, wherein the magnetic film forming method uses a target formed of an oxide of one kind or two or more kinds of elements T of at least Fe, Co, Ni and a target formed of an oxide of one kind or two or more kinds of elements M selected from Ti, Zr, Hf, Nb, Ta, Cr, Mo, Si, P, C, W, B, Al, Ga, Ge, and rare earth elements.

It is more preferable in the invention to use a target comprising one kind or two or more kinds of elements S of Fe, Co, Ni in addition to the above targets.

In the invention, the same element may be selected or a different element may be selected as the elements T and the elements S.

The composition ratio of the magnetic film may be adjusted by adjusting the area ratios of the respective targets or adjusting the powers imposed on the respective targets.

In the present invention, the magnetic film may be formed in an Ar atmosphere.

In the film forming method of the invention of the original application, it is preferable that the magnetic film formed on the substrate has a film structure in which a fine crystal phase mainly comprising the elements T or a fine crystal phase mainly comprising the elements T and elements S is mixed with an amorphous phase containing a large amount of an oxide of the elements M.

In the invention, it is more preferable that the fine crystal phase further contains an oxide of the elements M.

In the invention, it is preferable that the crystal structure of the fine crystal phase comprises one kind or two or more kinds of mixed structures of a bcc structure, an hcp structure and an fcc structure, and it is more preferable that the crystal structure of the fine crystal phase mainly comprises the bcc structure.

It is preferable that the average grain size of the fine crystal phase is 30 nm or less.

In the invention of the original application, it is preferable that the magnetic film is formed of the composition of $Fe_aM_bO_c$, where M is one kind or two or more kinds of elements selected from Ti, Zr, Hf, Nb, Ta, Cr, Mo, Si, P, C, W, B, Al, Ga, Ge, and rare earth elements and the composition ratios a, b, c satisfy the relationships of $45 \leq a \leq 70$, $5 \leq b \leq 30$, $10 \leq c \leq 40$, and $a+b+c=100$ in at %.

Otherwise, it is preferable that the magnetic film is formed of the composition of $(Co_{1-d}Q_d)_xM_yO_zX_w$, where Q is an element containing any one or both of Fe, Ni, M is one kind or two or more kinds of elements selected from Ti, Zr, Hf, Nb, Ta, Cr, Mo, Si, P, C, W, B, Al, Ga, Ge, and rare earth elements, X is one kind or two or more kinds of elements selected from Au, Ag, Cu, Ru, Rh, Os, Ir, Pt, Pd, and d representing the composition ratio satisfies $0 \leq d \leq 0.7$, x, y, z, w satisfy the relationships of $3 \leq y \leq 30$, $7 \leq z \leq 40$, $0 \leq w \leq 20$, $20 \leq y+z+w \leq 60$ in at % and the balance is x.

In the invention, it is more preferable that d representing the composition ratio of the magnetic film satisfies $0 \leq d \leq 0.3$, x, y, z, w satisfy the relationships of $7 \leq y \leq 15$, $20 \leq z \leq 35$, $0 \leq w \leq 19$, $30 \leq x+y+z \leq 50$ in at % and the balance is x.

Further, in the invention, it is preferable that the element Q is Fe, and it is more preferable in this case that the density ratio of Co and Fe is $0.3 \leq \{Co/(Co+Fe)\} \leq 0.8$.

In the above invention, when a magnetic film which mainly contains one kind or two or more kinds of elements of Fe, Co, Ni and one kind or two or more kinds of elements M selected from Ti, Zr, Hf, Nb, Ta, Cr, Mo, Si, P, C, W, B, Al, Ga, Ge, and rare earth elements, and O is formed to a magnetic film, the composition ratio of the formed magnetic film can be properly adjusted by improving a target material used in a film forming apparatus, whereby a soft magnetic film which has excellent magnetic characteristics, in particular, a high specific resistance, a high magnetic permeability and a high saturation flux density and a low coercive force in a high frequency region can be formed.

A feature of the above invention is to use a target formed of an oxide of one kind or two or more kinds of elements T of at least Fe, Co, Ni and a target formed of an oxide of one kind or two or more kinds of elements M selected from Ti, Zr, Hf, Nb, Ta, Cr, Mo, Si, P, C, W, B, Al, Ga, Ge, and rare earth elements. In particular, it is preferable to use one kind or two or more kinds of elements S of Fe, Co, Ni, in addition to the above two kinds of the targets.

The same element may be selected or a different element may be selected as the elements T and the elements S.

In the above invention, the composition ratio of the magnetic film can be properly adjusted by changing the area ratios of the above respective targets or the magnitudes of the powers imposed on the targets, respectively.

The film forming method of the present invention will be compared with the conventional film forming method as to the formation of, for example, a Fe—Hf—O film. In the conventional film forming method, two kinds of targets, that is, a target composed of Fe (corresponding to the elements S) and a target composed of $HfO_2$ (corresponding to an oxide of the elements M) are used, whereas the film forming method of the present invention employs the target composed of an oxide of Fe (corresponding to an oxide of the elements T) as described above, in addition to the above two kinds of the targets.

Since only the two kinds of the targets, that is, the target composed of Fe (corresponding to the elements S) and the target composed of $HfO_2$ (corresponding to an oxide of the elements M) are used in the conventional method, the area ratio of the target of $HfO_2$, for example, must be increased to increase the composition ratio of O. In this case, however, there arises a problem that since the composition ratio of Hf is increased simultaneously with the increase of the composition ratio of O, the composition ratio of Fe is lowered and the saturation flux density is reduced.

When the area ratio of the target formed of $HfO_2$ is decreased on the contrary, the specific resistance is reduced by the reduction of the composition ratio of O, which is not preferable.

In the Fe—Hf—O film having the high specific resistance and excellent in the high frequency characteristics, the ratio of Hf to O is made to about 1:3. However, since only the $HfO_2$ target is conventionally used as the target containing O, the ratio of Hf to O does not become about 1:3 in the formed Fe—Hf—O film because the composition ratio of O is originally only twice that of Hf.

Whereas, in the above invention, since the target composed of an oxide of Fe (an oxide of the elements T) is also used in addition to the target composed of Fe (the elements S) and the target composed of $Hfo_2$ (an oxide of the elements M), there is an additional target which can adjust the composition ratio of O. More specifically, it can be conceived that the composition ratio of O can be increased by increasing the area ratio of the target of $HfO_2$ and the target of an oxide of Fe, and, in particular, when the area ratio of an oxide of Fe is properly adjusted, the ratio of Hf to O can be made to about 1:3.

Since the composition ratio of Fe is abruptly lowered when the area ratio of the target of $HfO_2$ is made excessively large, it is possible to maintain the composition ratio of Fe large by properly adjusting the area ratio of the Fe target containing Fe and the target composed of an oxide of Fe.

As described above, the above invention can form a Fe—Hf—O film which has a composition ratio near to that of the $Fe_{54.9}Hf_{11.0}O_{34.1}$ film which is disclosed in, for example, Japanese Unexamined Patent Publication No. 6-316748 and excellent in magnetic characteristics by using the three kinds of the targets and properly adjusting the area ratios and the like of the respective targets.

In the above invention, the above targets can be used in the existing sputtering apparatuses such as, for example, the magnetron sputtering apparatus, the RF two-pole sputtering apparatus, the RF 3-pole sputtering apparatus, the ion beam sputtering apparatus, the confronting target type sputtering apparatus and the like.

However, since an oxide of the elements T and an oxide of the elements M are used as the targets in the above invention, a DC (direct current) sputtering apparatus cannot be used.

In the above invention, vapor deposition, MBE (molecular beam epitaxy), ICB (ion cluster beam) and the like can be used, in addition to the sputtering.

It is preferable that the magnetic film formed by the film forming method of the above invention has a film structure composed of an amorphous phase which contains a large amount of an oxide of the elements M and is mixed with a fine crystal phase mainly composed of the elements T or a fine crystal phase mainly composed of the elements T and the elements S.

The amorphous phase which contains the large amount of an oxide of the elements M has a high specific resistance, and when the composition of the magnetic film having been formed mainly contains Co in particular, the fine crystal layer also contains an oxide of the elements M. Accordingly, there is an advantage that the specific resistance of the magnetic film can be increased as a whole.

Although the fine crystal phase may have any crystal structure of a bcc structure (body-centered cubic structure), an hcp structure (hexagonal close-packed structure), and an fcc structure (face-centered cubic structure), it is more preferable that the greater part of the crystal structures is formed of the bcc structure.

It is preferable that the fine crystal phase has an average grain size of 30 nm or less.

It is conceived in the above invention that a soft magnetic film composed of a crystal such as, for example, ferrite, a soft magnetic film having an amorphous structure as a whole and further various types of magnetic films such as an anti-ferromagnetic film and the like can be formed in addition to the above film structure by adjusting the materials used to the targets and the area ratio of the targets.

The preferable composition of the magnetic film formed by the film forming method of the above invention is represented by $Fe_aM_bO_c$ or $(CO_{1-d}Q_d)_xM_yO_zX_w$.

In the above formulas, Q is an element containing any one or both of Fe and Ni, M is one kind or two or more kinds of elements selected from Ti, Zr, Hf, Nb, Ta, Cr, Mo, Si, P, C, W, B, Al, Ga, Ge, and rare earth elements and x is one kind or two or more kinds of elements selected from Au, Ag, Cu, Ru, Rh, Os, Ir, Pt, Pd.

In the magnetic film, Co, Fe and the element Q (Fe, Ni) are elements which exhibit a ferromagnetic property. Therefore, Co, Fe, Ni are elements for carrying magnetism. It is preferable that Co and Fe are contained in a large amount to obtain a particularly high saturation flux density. However, when the contents of Co and Fe are too small, the saturation flux density is reduced. Further, Co has an action for increasing uniaxial magnetic anisotropy.

The amorphous phase containing the large mount of an oxide of the elements M mainly contains one kind or two or more kinds of the elements M selected from Ti, Zr, Hf, Nb, Ta, Cr, Mo, Si, P, C, W, B, Al, Ga, Ge, and rare earth elements and O and is necessary to obtain soft magnetic characteristics and a high resistance at the same time. The elements M are liable to be bonded to oxygen and form oxide by being bonded to oxygen.

The specific resistance can be increased by adjusting the content of an oxide of the elements M.

The elements X which are one kind or two or more kinds of elements selected from Au, Ag, Cu, Ru, Rh, Os, Ir, Pt, Pd improve the corrosion resistance and the frequency characteristics of the soft magnetic film in the present invention. However, the content of the elements X exceeding 20 at % (atomic percentage) is not preferable because the soft magnetic characteristics and in particular the saturation magnetization are lowered by it.

When the composition formula is represented by $Fe_aM_bO_c$ in the above invention, it is preferable that compositions ratios a, b, c satisfy the relationships of $45 \leq a \leq 70$, $5 \leq b \leq 30$, $10 \leq c \leq 40$, $a+b+c=100$ in at % in order to maintain a high saturation magnetism while securing excellent soft magnetic characteristics. Further, to obtain a saturation magnetism of 1.0T or more, it is preferable to establish $a \leq 50$ at %, and to obtain a specific resistance of 500 $\mu\Omega\cdot$cm or more, it is more preferable to establish $a \leq 60$ at %.

When the composition formula is represented by $(CO_{1-d}Q_d)_xM_yO_zX_w$, it is preferable that d satisfies the relationship of $0 \leq d \leq 0.7$ and x, y, z, w satisfy the relationships of $3 \leq y \leq 30$, $7 \leq z \leq 40$, $0 \leq w \leq 20$, $20 \leq y+z+w \leq 60$ in at %. To reliably obtain more excellent soft magnetic characteristics and a high saturation magnetism, d must satisfy $0 \leq d \leq 0.3$ and x, y, z, w must satisfy the relationships of $7 \leq y \leq 15$, $20 \leq z \leq 35$, $0 \leq w \leq 19$, $30 \leq x+y+z \leq 50$ in at %.

When the magnetic film which mainly contains one kind or two or more kinds of elements of Fe, Co and Ni, the elements M (for example, Hf, etc.) and O is formed in the above invention, the above invention is characterized in that it uses the target composed of an oxide of the elements T (one or more kinds of Fe, Co, Ni) and the target composed of an oxide of the elements M as the targets used in the film forming apparatus, and it is more preferable that the present invention uses the target composed of the elements S (one or more kinds of Fe, Co, Ni), in addition to the above two kinds of the targets.

The use of the two kinds of the targets or the three kinds of the targets permits the composition ratio of a formed magnetic film to be properly adjusted, and, for example, a magnetic film (soft magnetic film) which has, for example, a high specific resistance and is excellent in high frequency characteristic can be formed.

The invention of U.S. Ser. No. 09/264,839 has been described above. Further, the application can suitably adjust the composition ratio of a magnetic film and provides a magnetic film forming method excellent in the reproducibility of a formed film as described below.

A magnetic film forming method of the present invention includes a step of preparing a material A formed of oxide of an element T of at least one kind of Fe, Co, and Ni, a material B formed of oxide of an element M of at least one kind selected from Ti, Zr, Hf, Nb, Ta, Cr, Mo, Si, P, C, W, B, Al, Ga, Ge, and rare earth elements and a material C formed of an element S of at least one kind of Fe, Co, and Ni; a target making step of making a target by sintering the powders of the material A, the material B and the material C; a disposing step of disposing the target in a film forming apparatus so that the target confronts a substrate; and a film forming step of forming a magnetic film on the substrate.

It is preferable that the magnetic film forming method includes a magnetic film composition ratio adjusting step at which the target is made by adjusting the ratios of the material A, the material B, and the material C and sintering them.

It is preferable that the composition ratio of the magnetic film is controlled by adjusting electric power imposed on the target at the magnetic film composition ratio adjusting step.

It is preferable that the magnetic film is formed in an Ar atmosphere at the film forming step.

It is preferable that the film structure of the magnetic film having been formed is such that at least one kind of elements selected from Ti, Zr, Hf, Nb, Ta, Cr, Mo, Si, P, C, W, B, Al, Ga, Ge, and rare earth elements, amorphous in which oxygen is contained, and a fine crystal phase mainly comprising at least one kind of elements of Fe, Co, and Ni exist in the magnetic film in a mixed state. It is preferable that the fine crystal phase further contains the oxide of the element M. It is preferable that the crystal structure of the fine crystal phase is composed of the mixed structure of at least one kind of a bcc structure, an hcp structure and an fcc structure. It is preferable that the crystal structure of the fine crystal phase is mainly composed of the bcc structure. In addition, it is preferable that the fine crystal phase has an average grain size of 30 nm or less.

It is preferable that the magnetic film is formed of the composition of $Fe_aM_bO_c$, where M is at least one kind of elements selected from Ti, Zr, Hf, Nb, Ta, Cr, Mo, Si, P, C, W, B, Al, Ga, Ge, and rare earth elements and the composition ratios a, b, and c satisfy the relationships of $45 \leq a \leq 70$, $5 \leq b \leq 30$, $10 \leq c \leq 40$, and $a+b+c=100$ in at %.

The magnetic film may be formed at the composition ratio of $(Co_{1-d}Q_d)_xM_yO_zX_w$, where Q is an element containing any one or both of Fe and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and d representing the composition ratio satisfies $0 \leq d \leq 0.7$, x, y, z, and w satisfy the relationships of $3 \leq y \leq 30$, $7 \leq z \leq 40$, $0 \leq w \leq 20$, and $20 \leq y+z+w \leq 60$ in at %, and the balance is x.

Further, d representing the composition ratio of the magnetic film may satisfy $0 \leq d \leq 0.3$, x, y, z, and w satisfy the relationships of $7 \leq y \leq 15$, $20 \leq z \leq 35$, $0 \leq w \leq 19$, and $30 \leq x+y+z \leq 50$ in at %, and the balance may be x. It is preferable that the element Q is Fe. Further, it is preferable that the density ratio of Co and Fe is $0.3 \leq \{Co/(Co+Fe)\} \leq 0.8$.

In addition, the magnetic film may be formed at the composition ratio of $(Fe_{1-e}Co_e)_xM_yO_zX_w$, where Q is an element containing any one or both of Co and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and e representing the composition ratio satisfies $0 \leq e \leq 0.3$, x, y, z, and w satisfy the relationships of $5 \leq y \leq 30$, $10 \leq z \leq 40$, $0 \leq w \leq 20$, and $20 \leq y+z \leq 60$ in at %, and the balance is x.

Another magnetic film forming method of the present invention includes a step of preparing the material A formed of oxide of the element T of at least one kind of Fe, Co, and Ni and the material B formed of oxide of the element M of at least one kind selected from Ti, Zr, Hf, Nb, Ta, Cr, Mo, Si, P, C, W, B, Al, Ga, Ge, and rare earth elements; a target making step of making a target by sintering the powders of the material A and the material B; a disposing step of disposing the target in a film forming apparatus so that the target confronts a substrate; and a film forming step of forming a magnetic film on the substrate.

It is preferable that the magnetic film forming method includes a magnetic film composition ratio adjusting step at which the target is made by adjusting the ratios of the material A, the material B, and the material C and sintering them.

It is preferable that the composition ratio of the magnetic film is controlled by adjusting electric power imposed on the target at the magnetic film composition ratio adjusting step.

It is preferable that the magnetic film is formed in an Ar atmosphere at the film forming step.

It is preferable that the film structure of the magnetic film having been formed is such that at least one kind of elements selected from Ti, Zr, Hf, Nb, Ta, Cr, Mo, Si, P, C, W, B, Al, Ga, Ge, and rare earth elements, amorphous in which oxygen is contained, and a fine crystal phase mainly comprising at least one kind of elements of Fe, Co, and Ni exist in the magnetic film in a mixed state. It is preferable that the fine crystal phase further contains the oxide of the element M. It is preferable that the crystal structure of the fine crystal phase is composed of the mixed structure of at least one kind of a bcc structure, an hcp structure and an fcc structure. It is preferable that the crystal structure of the fine crystal phase is mainly composed of the bcc structure. In addition, it is preferable that the fine crystal phase has an average grain size of 30 nm or less.

It is preferable that the magnetic film is formed of the composition of $Fe_aM_bO_c$, where M is at least one kind of elements selected from Ti, Zr, Hf, Nb, Ta, Cr, Mo, Si, P, C, W, B, Al, Ga, Ge, and rare earth elements and the composition ratios a, b, and c satisfy the relationships of $45 \leq a \leq 70$, $5 \leq b \leq 30$, $10 \leq c \leq 40$, and $a+b+c=100$ in at %.

The magnetic film may be formed at the composition ratio of $(Co_{1-d}Q_d)_xM_yO_zX_w$, where Q is an element containing any one or both of Fe and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and d representing the composition ratio satisfies $0 \leq d \leq 0.7$, x, y, z, and w satisfy the relationships of $3 \leq y \leq 30$, $7 \leq z \leq 40$, $0 \leq w \leq 20$, and $20 \leq y+z+w \leq 60$ in at %, and the balance is x.

Further, d representing the composition ratio of the magnetic film may satisfy $0 \leq d \leq 0.3$, x, y, z, and w satisfy the relationships of $7 \leq y \leq 15$, $20 \leq z \leq 35$, $0 \leq w \leq 19$, and $30 \leq x+y+z \leq 50$ in at %, and the balance may be x. It is preferable that the element Q is Fe. Further, it is preferable that the density ratio of Co and Fe is $0.3 \leq \{Co/(Co+Fe)\} \leq 0.8$.

In addition, the magnetic film may be formed at the composition ratio of $(Fe_{1-e}Co_e)_xM_yO_zX_w$, where Q is an element containing any one or both of Co and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and e representing the composition ratio satisfies $0 \leq e \leq 0.3$, x, y, z, and w satisfy the relationships of $5 \leq y \leq 30$, $10 \leq z \leq 40$, $0 \leq w \leq 20$, and $20 \leq y+z \leq 60$ in at %, and the balance is x.

The magnetic film forming method of the present invention includes a step of preparing the material A formed of oxide of the element T of at least one kind of Fe, Co, and Ni and the material B formed of oxide of the element M of at least one kind selected from Ti, Zr, Hf, Nb, Ta, Cr, Mo, Si, P, C, W, B, Al, Ga, Ge, and rare earth elements; a target making step of making a target by sintering the powders of the material A and the material B; the disposing step of disposing the target in the film forming apparatus so that the target confronts the substrate; and a film forming step of forming the magnetic film on the substrate.

More preferably, the another magnetic film forming method of the present invention includes a step of preparing the material A formed of oxide of the element T of at least one kind of Fe, Co, and Ni, the material B formed of oxide of the element M of at least one kind selected from Ti, Zr, Hf, Nb, Ta, Cr, Mo, Si, P, C, W, B, Al, Ga, Ge, and rare earth elements and the material C formed of the element S of at least one kind of Fe, Co, and Ni; a target making step of making a target by sintering the powders of the material A, the material B and the material C; a disposing step of disposing the target in the film forming apparatus so that the target confronts the substrate; and a film forming step of forming the magnetic film on the substrate.

The above magnetic film forming methods of the present invention can reduce the variations of the film thickness, magnetic and electric characteristics and the like of a film formed on the same substrate surface and increase mass-productivity. Further, the magnetic film forming methods of the present invention can form a magnetic film having excellent magnetic characteristics, a high specific resistance, magnetic permeability and saturation flux density and small coercive force, similar to the above film forming method of the present invention.

The provision of the magnetic film composition adjusting step, at which the target is made by adjusting the ratios of the materials A and B or the ratios of the materials A, B, and C and sintering them, permits the adjustment of the composition ratio of the magnetic film. Further, it is also preferable to perform the magnetic film composition adjusting step by adjusting electric power imposed on the target.

Since the magnetic film is formed in the Ar atmosphere at the film forming step of the other magnetic film forming method of the present invention, the variations of the film thicknesses, magnetic and electric characteristics and the like of a film formed on the same substrate surface can be reduced and the mass-productivity of the film can be increased as compared with a magnetic film formed by the conventional reactive sputtering method because the oxygen density and the like in a substrate are less varied.

In the present invention, the target can be used in existing apparatuses for sputtering, for example, magnetron sputtering, RF-two-pole sputtering, RF-three-pole sputtering, ion beam sputtering, confronting-target sputtering and the like. However, since the oxide of the element T and the oxide of the element M are used as the target in the present invention, a DC (direct current) sputtering apparatus cannot be used. Further, in the present invention, vapor deposition, MBE (molecular beam epitaxy), ICB (ion cluster beam) and the like can be used, in addition to the sputtering.

It is preferable that the film structure of the magnetic film formed by the film forming methods of the present invention is such that the fine crystal phase mainly composed of the element T or the fine crystal phase mainly composed of the element T and the element S is mixed with the amorphous phase containing a large amount of the oxide of the element M.

While the amorphous phase containing the large amount of the oxide of the element M has a high specific resistance, it has such an advantage that when the composition of a film having been formed is mainly composed of Co in particular, the specific resistance of the magnetic film can be increased as a whole because the fine crystal phase also contains the oxide of the element M.

While the fine crystal phase may have any of the crystal structures of the bcc structure (body-centered cubic structure), the hcp structure (hexagonal close-packed structure) and the fcc structure (face-centered cubic structure), it is more preferable that almost all the crystal structure is the bcc structure. Further, it is preferable that the average grain size of the fine crystal phase is 30 nm or less.

In the present invention, it is contemplated that a soft magnetic film composed of a crystal body such as, for example, ferrite and a soft magnetic film having an amorphous structure as a whole can be formed, in addition to the above film structure, by adjusting the material to be used in the target and the area ratio thereof and that various magnetic films such as an anti-ferromagnetic film and the like can be formed thereby.

A preferable composition of the magnetic film formed by the film forming methods of the present invention is represented by $Fe_aM_bO_c$ or $(CO_{1-d}Q_d)_xM_yO_zX_w$, where Q is the element containing any one or both of Fe and Ni, M is one kind or two or more kinds of elements selected from Ti, Zr, Hf, Nb, Ta, Cr, Mo, Si, P, C, W, B, Al, Ga, Ge, and rare earth elements, and X is one kind or two or more kinds of the elements selected from Au, Ag, Cu, Ru, Rh, Os, Ir, Pt, and Pd.

In the magnetic film, Co, Fe and the element Q (Fe and Ni) are elements showing ferromagnetism. Thus, Co, Fe, and Ni are elements carrying magnetism. In particular, while it is preferable to contain Co and F in large amounts to obtain highly saturated magnetic flux, when the contents of them are too small, saturation flux density is reduced. Further, Co has an action for increasing uniaxial magnetic anisotropy.

The element M, which mainly contains one kind or two or more kinds of elements M selected from Ti, Zr, Hf, Nb, Ta, Cr, Mo, Si, P, C, W, B, Al, Ga, Ge, and rare earth elements and O, is necessary to make soft magnetic characteristics compatible with a high resistance. They are liable to bond to oxygen and form oxide by bonding to it. Further, the specific resistance can be increased by adjusting the content of the oxide of the element M.

The element X, which is one kind or two or more kinds of the elements selected from Au, Ag, Cu, Ru, Rh, Os, Ir, Pt, and Pd, improves the corrosion resistance and the frequency characteristics of the soft magnetic film of the present invention. However, the contents thereof exceeding 20 at % (atomic %) are not preferable because soft magnetic characteristics, in particular, saturation magnetization is excessively lowered thereby.

In the present invention, when a composition formula is represented by $Fe_aM_bO_c$, it is preferable that the composition ratios a, b, and c satisfy the relationships of $45 \leq a \leq 70$, $5 \leq b \leq 30$, $10 \leq c \leq 40$, and $a+b+c=100$ in at % in order to maintain high saturation magnetization while securing excellent soft magnetic characteristics. Further, $a \leq 50$ at % is preferable to obtain saturation magnetization of at least 1.0 T and $a \leq 60$ at % is more preferable to obtain the specific resistance of at least 500 $\mu\Omega \cdot cm$.

Further, when the composition formula is represented by $(CO_{1-d}Q_d)_xM_yO_zX_w$, it is preferable that d satisfies the relationship of $0 \leq d \leq 0.7$, and x, y, z, and w satisfy the relationships of $3 \leq y \leq 30$, $7 \leq z \leq 40$, $0 \leq w \leq 20$, and $20 \leq y+z+w \leq 60$ in at %. It is preferable that d satisfies the relationship of $0 \leq d \leq 0.3$, and x, y, z, and w satisfy the relationships of $7 \leq y \leq 15$, $20 \leq z \leq 35$, $0 \leq w \leq 19$, and $30 \leq x+y+z \leq 50$ in at % in order to reliably obtain excellent soft magnetic characteristics and high saturation magnetization.

Further, in the present invention, the magnetic film may be formed at the composition ratio of $(Fe_{1-e}Co_e)_xM_yO_zX_w$ to maintain the high saturation magnetization while securing the excellent soft magnetic characteristics.

The composition ratio is such that Q is the element containing any one or both of Fe and Ni, M is at least one kind of the elements selected from Ti, Zr, Hf, Nb, Ta, Cr, Mo, Si, P, C, W, B, Al, Ga, Ge, and rare earth elements, X is at least one kind of the elements selected from Au, Ag, Cu, Ru, Rh, Os, Ir, Pt, and Pd, and e representing the composition ratio satisfies the relationship of $0 \leq e \leq 0.3$, x, y, z, and x, y, z, and w satisfy the relationships of $5 \leq y \leq 30$, $10 \leq z \leq 40$, $0 \leq w \leq 20$, and $20 \leq y+z \leq 60$ in at %, and the balance is x.

First, the invention of U.S. Ser. No. 09/264,839 as an original application of the present application will be described.

Figure 1:
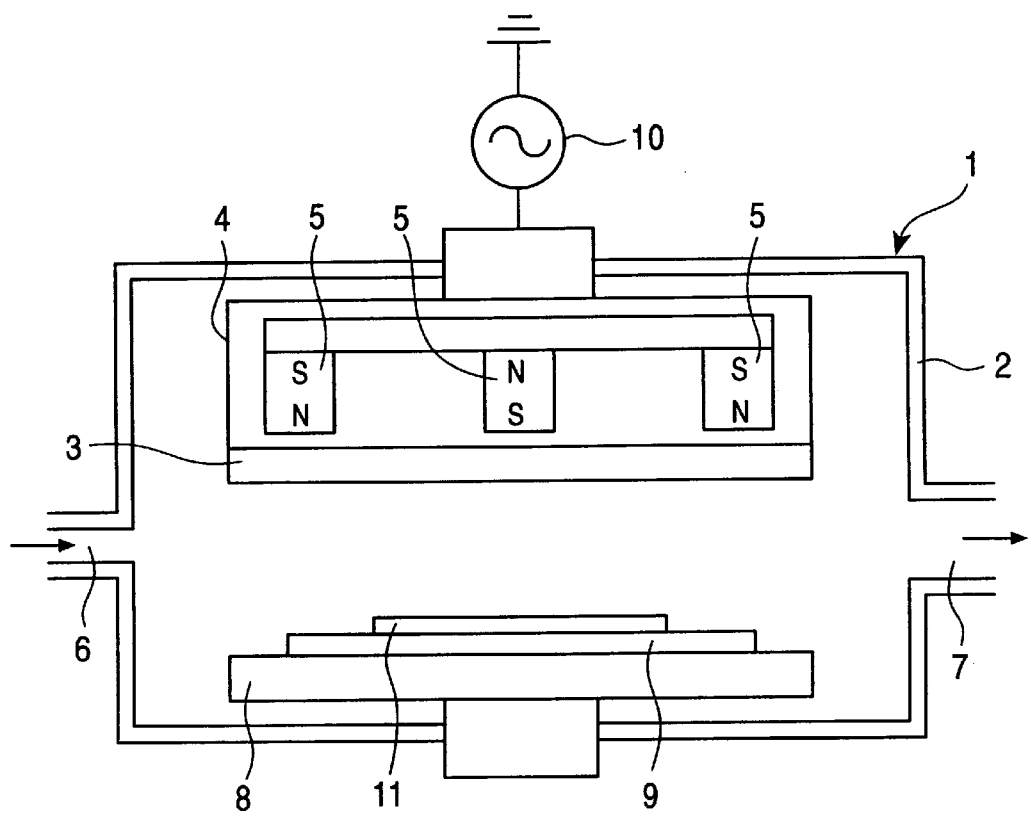
FIG. 1 is a schematic view showing the inner structure of a magnetron sputtering apparatus.
Figure 2:
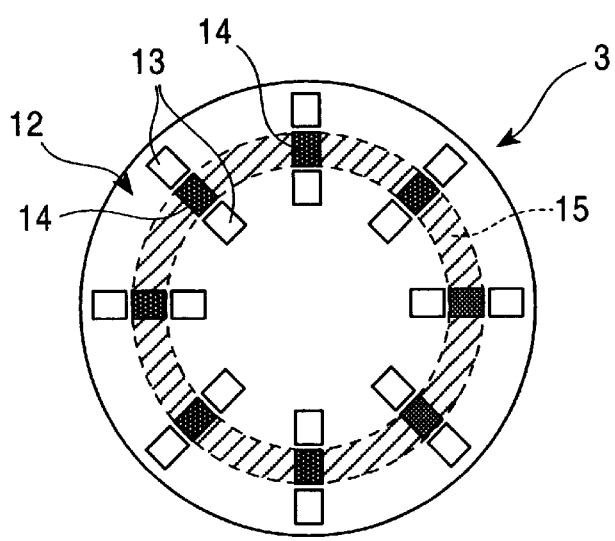
FIG. 2 is a front elevational view showing an embodiment of a target of the present invention used in a film forming apparatus.

FIG. 1 is a schematic view showing the inner structure of a magnetron sputtering apparatus and FIG. 2 is a front elevational view showing an embodiment of a target of the present invention used in a film forming apparatus.

As shown in FIG. 1, an electrode unit 4 for mounting a target (composite type target) 3 and a substrate holding unit 8 located at a position confronting the target 3 are disposed in the chamber 2 of a magnetron sputtering apparatus 1. A substrate 9 is mounted on the substrate holding unit 8.

As shown in FIG. 1, magnets 5 are disposed in the electrode unit 4 and an erosion area (not shown) is formed on the surface of the target 3 by the magnetic fields generated from the magnets 5.

As shown in FIG. 1, the chamber 2 has a gas introducing port 6 and a gas discharge port 7 formed thereto and an Ar (argon) gas is introduced through the gas introducing port 6.

When a high frequency is imposed on the electrode unit 4 from a high frequency power supply (RF power supply) 10, a magnetron discharge is generated by the mutual action of an electric field and a magnetic field and the target 3 is sputtered so that a magnetic film 11 formed on the substrate 9 located at a position confronting the target 3.

The magnetic film 11 formed by the present invention mainly contains one kind or two or more kinds of elements of Fe, Co, Ni, one or two or more kinds of the elements M selected from Ti, Zr, Hf, Nb, Ta, Cr, Mo, Si, P, C, W, B, Al, Ga, Ge, and rare earth elements, and O.

In the present invention, the target 3 used in the film forming apparatus is composed of at least a target composed of an oxide of one kind or two or more kinds of the elements T of Fe, Co, Ni and a target composed of an oxide of the elements M.

Further, it is preferable in the present invention to use a target composed of one kind or two or more kinds of the elements T of Fe, Co, Ni, in addition to the above two kinds of the targets.

Both of the elements T and the elements S are composed of the elements selected from one kind or two or more kinds of Fe, Co, Ni, and the elements T and the elements S may be composed of the same element or composed of a different element.

A composite type target as shown in, for example, FIG. 2 can be exemplified as the arrangement of the target 3.

As shown in FIG. 2, a plurality of square chips 13, 14 are disposed on the surface of a circular target 12. The chips 13, 14 shown in FIG. 2 are thinned out and a larger number of the chips 13, 14 are actually disposed on the surface of the target 12. The number of the chips 13, 14 can be arbitrarily determined.

The shapes of the target 12 and the chips 13, 14 may be any shapes other than those shown in FIG. 2.

A slant portion 15 in FIG. 2 shows an erosion area and the chips disposed to the erosion area, that is, the chips 14 are located at the position where they can be most easily sputtered.

The target 12 is formed of any one of an oxide of the elements T, an oxide of the elements M and the elements S and the chips 13, 14 are formed of the remaining materials.

A method of adjusting the composition ratio of the magnetic film 11 deposited on the substrate 9 shown in FIG. 1 is to properly adjust the area ratios of the respective targets (chips) formed of an oxide of the elements T, an oxide of the elements M and the elements S.

To explain the method using the arrangement shown in FIG. 2 as an example, the composition ratio of the magnetic film 11 can be optionally changed by properly adjusting the entire area of the plurality of the chips 13 and the entire area of the plurality of the chips 14 disposed on the target 12 and the area owned by the target 12 (the area obtained by subtracting the entire areas of the chips 13, 14 from the surface area of the target 12).

To properly adjust the area ratios of the target 12 and the chips 13, 14, it is sufficient to, for example, increase or decrease the number of the chips 13, 14 or change the size of the chips 13, 14.

As another method of adjusting the composition ratio of the magnetic film 11, three sets of the electrode units 4 as shown in FIG. 1 are prepared (a so-called RF three-pole sputtering apparatus) and the targets 12 formed of an oxide of the elements T, the targets 12 formed of an oxide of the elements M and the targets 12 formed of the elements S are disposed to the electrode units 4, respectively.

Then, an amount of sputtering is adjusted by changing the powers imposed from the high frequency power supplies (RF power supplies) 10 connected to the respective electrode units 4 to thereby properly adjust the composition ratio of the magnetic film 11 formed on the substrate 9.

At the time, the respective electrode units 4 or the substrate holding unit 8 must be arranged as a rotary type.

Vapor deposition, MBE (molecular beam epitaxy), ICB (ion cluster beam) and the like can be used to form the magnetic film 11 in addition to the sputtering.

Further, the existing sputtering apparatuses such as, for example, the magnetron sputtering apparatus, the RF two-pole sputtering apparatus, the RF 3-pole sputtering apparatus, the ion beam sputtering apparatus, the confronting target type sputtering apparatus and the like as shown in FIG. 1 may be used as the sputtering apparatus.

Next, the magnetic film 11 having the composition of Fe—Zr—O was formed on the substrate 9 using the target (composite type target) 3 shown in FIG. 1 in the magnetron sputtering apparatus shown in FIG. 1 and the magnetic characteristics of the magnetic film 11 were measured.

In the experiment, a plurality of the chips 13 formed of $Fe_3O_4$ (an oxide of the elements T) and a plurality of the chips 14 formed of $ZrO_2$ (oxide of the elements M) were disposed on the target 12 formed of Fe (the elements S) and the composition ratio of a Fe—Zr—O film to be formed was changed by changing the number of the chips 13, 14.

The compositions of respective Fe—Zr—O films were analyzed with an EPMA. Table 1 shows a result of the experiment.

Further, as shown in FIG. 1, it can be found that when the number of the chips of $ZrO_2$ is the same, the larger number of the chips of $Fe_3O_4$ increases the composition ratio of O, whereby the specific resistance $\rho$ (after annealing) is increased.

Figure 3:
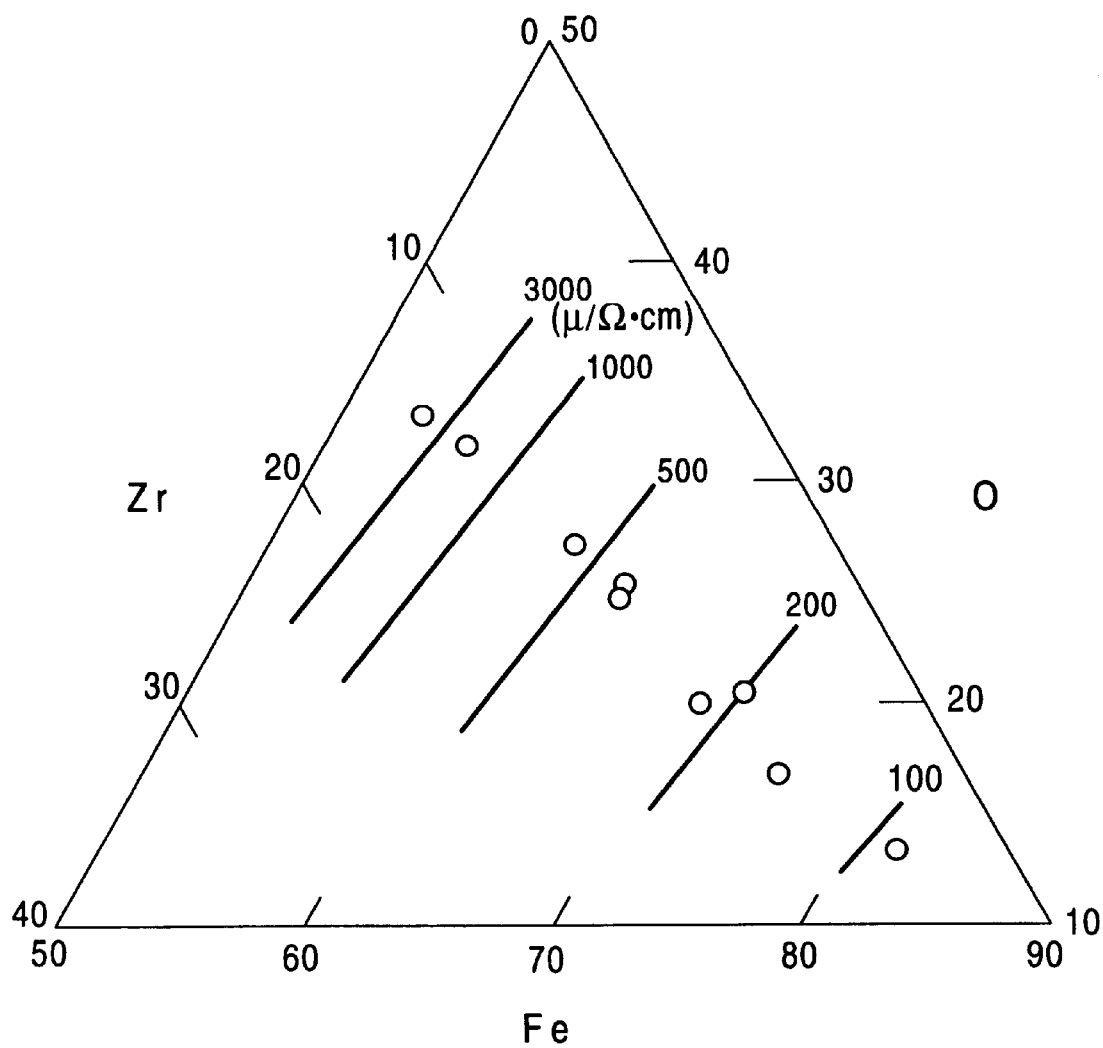
FIG. 3 is a ternary view showing the composition dependency of a specific resistance in a Fe—Zr—O film.

The specific resistances $\rho$ (after annealing) of the respective specimens are shown in a ternary view based on the result of Table 1. FIG. 3 shows the result.

As shown in FIG. 3, as the composition ratio of O increases and the composition ratio of Fe decreases, the specific resistance $\rho$ (after annealing) is increased, and when Fe is set to 60 at % or less, a high specific resistance of 500 $\mu\Omega\cdot$cm or more can be obtained.

Next, it can be found that a saturation magnetism Is is decreased as the number of the chips of $ZrO_2$ increases, that is, as the composition ratio of Fe decreases as shown in Table 1.

Figure 4:
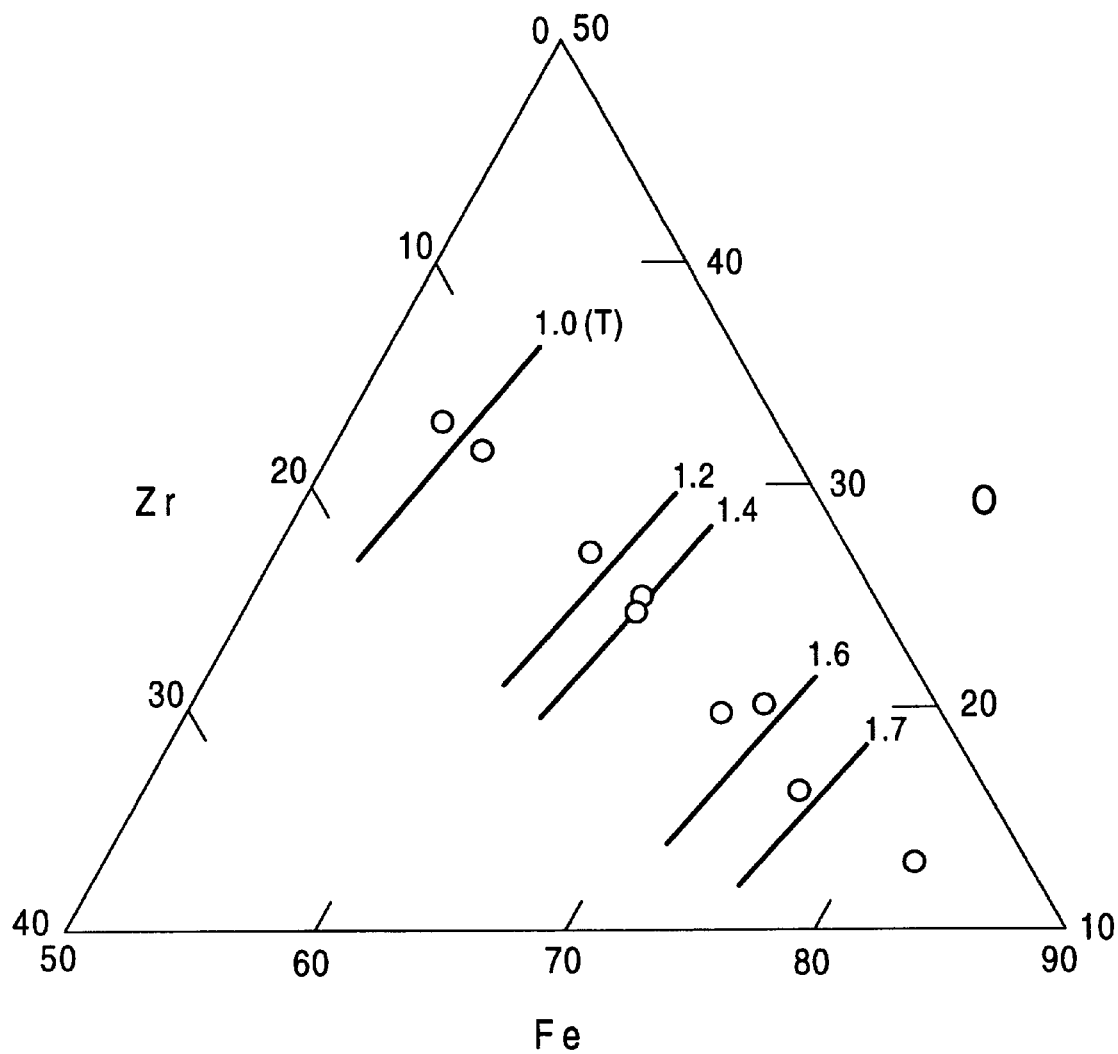
FIG. 4 is a ternary view showing the composition dependency of a saturation flux density in the Fe—Zr—O film.

FIG. 4 is a ternary view showing the saturation magnetism Is in the respective specimens based on Table 1.

As shown in FIG. 4, as the composition ratio of Fe increases, that is, as the composition ratios of Zr and O decrease, the saturation magnetism Is is increased, and when Fe is set to 50 at % or more, a high saturation magnetism of 1.0T or more can be obtained.

Next, the target 12 shown in FIG. 2 was formed of Fe, a plurality of the chips 13 were formed of $Fe_3O_4$, and a

TABLE 1

| No. | Number of chips $ZrO_2$ | $Fe_3O_4$ | Quantitative value (at %) Fe | Zr | O | ρ as dp | ρ UFA | μ' | Is (T) | Hc (Oe) | Hk (Oe) |
|---|---|---|---|---|---|---|---|---|---|---|---|
| 1 | 19 | 12 | 81.2 | 5.30 | 13.5 | 112 | 91 | 438 | 1.73 | 1.8 | 7.6 |
| 2 | 19 | 16 | 76.6 | 6.30 | 17.0 | 172 | 132 | 1454 | 1.69 | 1.2 | 8.3 |
| 3 | 19 | 20 | 73.8 | 6.0 | 20.2 | 306 | 199 | 69 | 1.56 | 1.6 | 85 |
| 4 | 24 | 16 | 72.6 | 7.4 | 19.9 | 329 | 238 | 799 | 1.55 | 1.0 | 10 |
| 5 | 24 | 20 | 66.6 | 7.5 | 25.8 | 606 | 379 | 206 | 1.32 | 5.7 | |
| 6 | 28 | 16 | 66.5 | 8.9 | 24.6 | 576 | 387 | 1266 | 1.40 | 10 | 10 |
| 7 | 32 | 16 | 58.2 | 10.9 | 30.9 | 1689 | 1164 | 1032 | 1.16 | 3.3 | 6.3 |
| 8 | 32 | 20 | 53.7 | 11.8 | 34.5 | 8310 | 4301 | 25 | 0.95 | 15 | 27 |

"ρ as dp" in Table 1 shows a specific resistance value before annealing and "ρ UFA" shows a specific resistance value after annealing is performed at 400° C. in a static magnetic field. Further, all the other magnetic characteristics were measured in the static magnetic field after the annealing was performed at 400° C. in the static magnetic field, and a magnetic permeability μ' was measured at 100 MHz.

As shown in Table 1, it can be found that the composition ratio of Fe is decreased and the composition ratios of Zr and O are increased on the contrary by an increase in the number of the chips of $ZrO_2$.

plurality of the chips 14 were formed of $HfO_2$. Then, a Fe—Hf—O film was formed on the substrate 9 shown in FIG. 1 and the magnetic characteristics of the film were measured.

In the experiment, the composition ratios and the magnetic characteristics of Fe—Hf—O films were examined in the respective numbers of the chips 13, 14 by changing the numbers of the chips. Further, the composition ratios were measured with the EPMA. Table 2 shows the result of the experiment.

TABLE 2

| No. | Number of chips $HfO_2$ | $Fe_3O_4$ | Quantitative value (at %) Fe | Hf | O | ρ as dp | ρ UFA | μ' | Is (T) | Hc (Oe) | Hk (Oe) | λ ($10^{-6}$) |
|---|---|---|---|---|---|---|---|---|---|---|---|---|
| 1 | 15 | 21 | 68.4 | 9.65 | 22.0 | 245 | 174 | 1140 | 1.38 | 1.2 | 8.1 | 5.0 |
| 2 | 15 | 29 | 67.4 | 8.81 | 23.8 | 334 | 197 | 271 | 1.26 | 2.5 | 10 | 5.1 |

TABLE 2-continued

| No. | Number of chips HfO$_2$ | Number of chips Fe$_3$O$_4$ | Quantitative value (at %) Fe | Quantitative value (at %) Hf | Quantitative value (at %) O | ρ as dp | ρ UFA | μ' | Is (T) | Hc (Oe) | Hk (Oe) | λ (10$^{-6}$) |
|---|---|---|---|---|---|---|---|---|---|---|---|---|
| 3 | 18 | 18 | 66.7 | 11.4 | 21.9 | 367 | 256 | 1240 | 1.38 | 1.1 | 9.4 | 6.0 |
| 4 | 18 | 26 | 66.1 | 10.7 | 23.2 | 337 | 231 | 1076 | 1.26 | 1.7 | 11 | 5.6 |
| 5 | 18 | 33 | 59.4 | 11.9 | 28.7 | 489 | 321 | 366 | 1.10 | 2.4 | 6.8 | 5.2 |
| 6 | 21 | 15 | 61.8 | 13.3 | 24.9 | 504 | 262 | 948 | 1.28 | 2.0 | 11 | 6.8 |
| 7 | 21 | 23 | 61.6 | 12.9 | 25.5 | 636 | 383 | 1350 | 1.27 | 1.2 | 6.8 | 6.3 |
| 8 | 21 | 30 | 55.6 | 13.5 | 30.9 | 1330 | 580 | 273 | 1.05 | 0.95 | 5.7 | 5.7 |
| 9 | 26 | 15 | 48.6 | 15.9 | 35.5 | 1262 | 691 | 1118 | 1.09 | 1.3 | 9.1 | |
| 10 | 26 | 16 | 48.4 | 15.7 | 35.9 | 1869 | 906 | 1106 | 1.08 | 1.3 | 7.1 | 5.3 |
| 11 | 27 | 9 | 51.5 | 15.8 | 32.7 | 754 | 488 | 1358 | 1.14 | 1.2 | 6.5 | 5.4 |
| 12 | 27 | 12 | 50.0 | 16.3 | 33.7 | 1090 | 625 | 1460 | 1.06 | 1.3 | 7.7 | |
| 13 | 27 | 15 | 47.2 | 15.6 | 37.2 | 1541 | 799 | 1351 | 1.05 | 1.2 | 7.9 | 5.0 |
| 14 | 27 | 16 | 47.8 | 16.3 | 35.9 | 2816 | 1200 | 929 | 1.02 | 1.2 | 7.0 | |
| 15 | 27 | 17 | 47.9 | 16.4 | 35.8 | 3142 | 1296 | 817 | 1.03 | 1.3 | 7.0 | |
| 16 | 27 | 21 | 46.2 | 16.5 | 37.4 | 7870 | 2807 | 302 | 0.94 | 1.8 | 5.0 | 4.7 |
| 17 | 28 | 14 | 47.3 | 16.4 | 36.3 | 1914 | 908 | 1322 | 0.98 | 1.0 | 5.7 | 4.5 |
| 18 | 28 | 15 | 47.2 | 16.8 | 36.0 | 2748 | 1167 | 926 | 0.97 | 0.99 | 6.9 | |
| 19 | 33 | 9 | 46.7 | 18.3 | 35.0 | 2367 | 1009 | 273 | 0.83 | 1.0 | 3.3 | 1.5 |
| 20 | 33 | 15 | 43.2 | 19.0 | 37.7 | 12431 | 5351 | 70 | 0.74 | 1.5 | 3.0 | 1.4 |

"ρ as dp" in Table 2 shows a specific resistance value before annealing and "ρ UFA" shows a specific resistance value after annealing was performed at 400° C. in a static magnetic field.

Further, all the other measured values were measured in the static magnetic field after the annealing was performed at 400° C. in the static magnetic field and a magnetic permeability μ' was measured at 100 MHz.

Further, a magnetostriction constant λ was measured by an optical lever method (measured in a static magnetic field up to 4 kA/m).

As shown in Table 1, it can be found that the composition ratio of Fe is decreased and the composition ratios of Zr and O are increased on the contrary by an increased in the number of the chips of ZrO$_2$.

As to the specific resistance ρ (after annealing), it can be found that when the number of the chips of HfO$_2$ is the same, the larger number of the chips of Fe$_3$O$_4$ increases the composition ratio of O, whereby the specific resistance ρ (after annealing) is increased.

Figure 5:
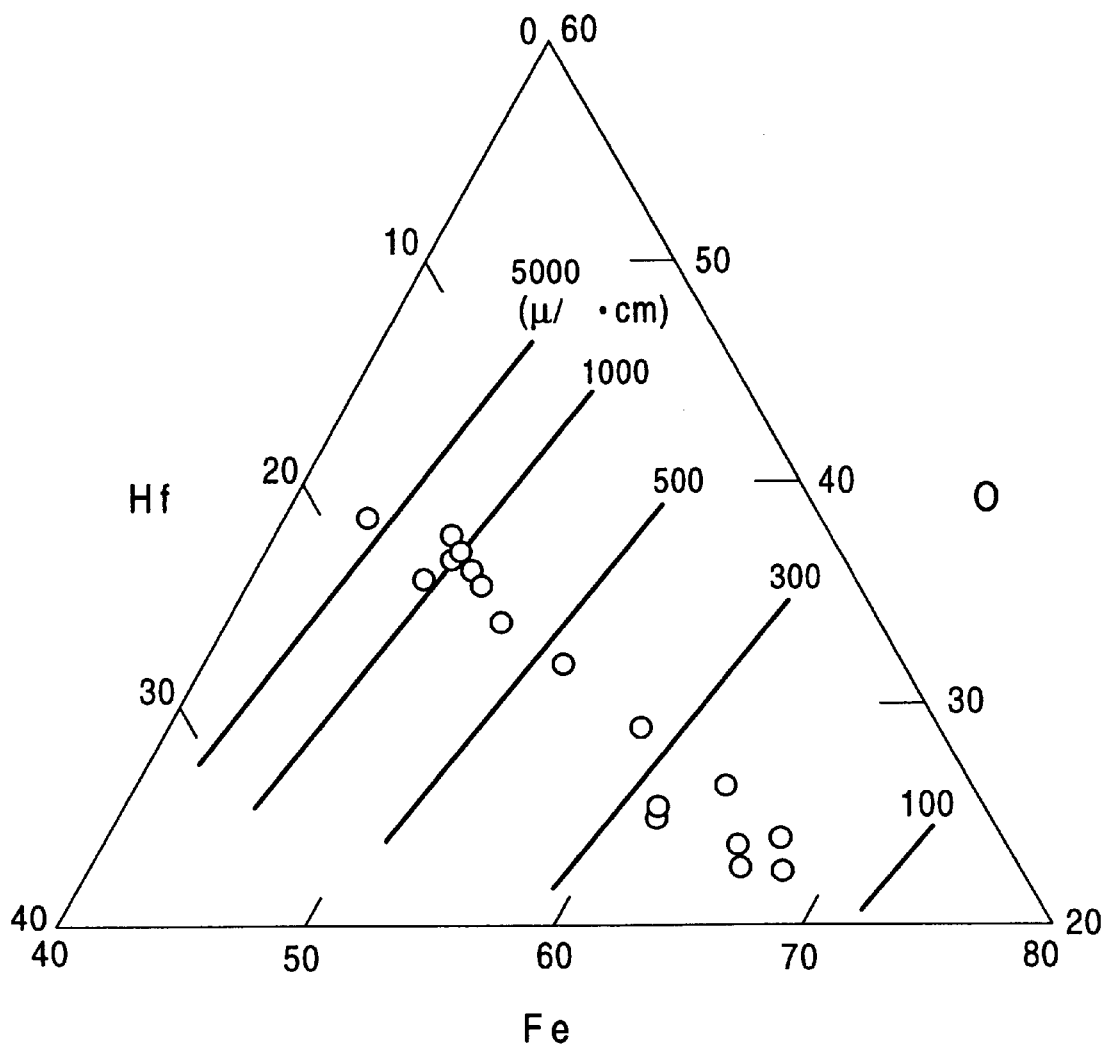
FIG. 5 is a ternary view showing the composition dependency of a specific resistance in a Fe—Hf—O film.

The specific resistances ρ (after annealing) of the respective specimens are shown in a ternary view based on the arrangement shown Table 2. FIG. 5 shows the result of it.

As shown in FIG. 5, it can be found that as the composition ratio of O increases and the composition ratio of Fe decreases, the specific resistance ρ(after annealing) is increased.

Figure 6:
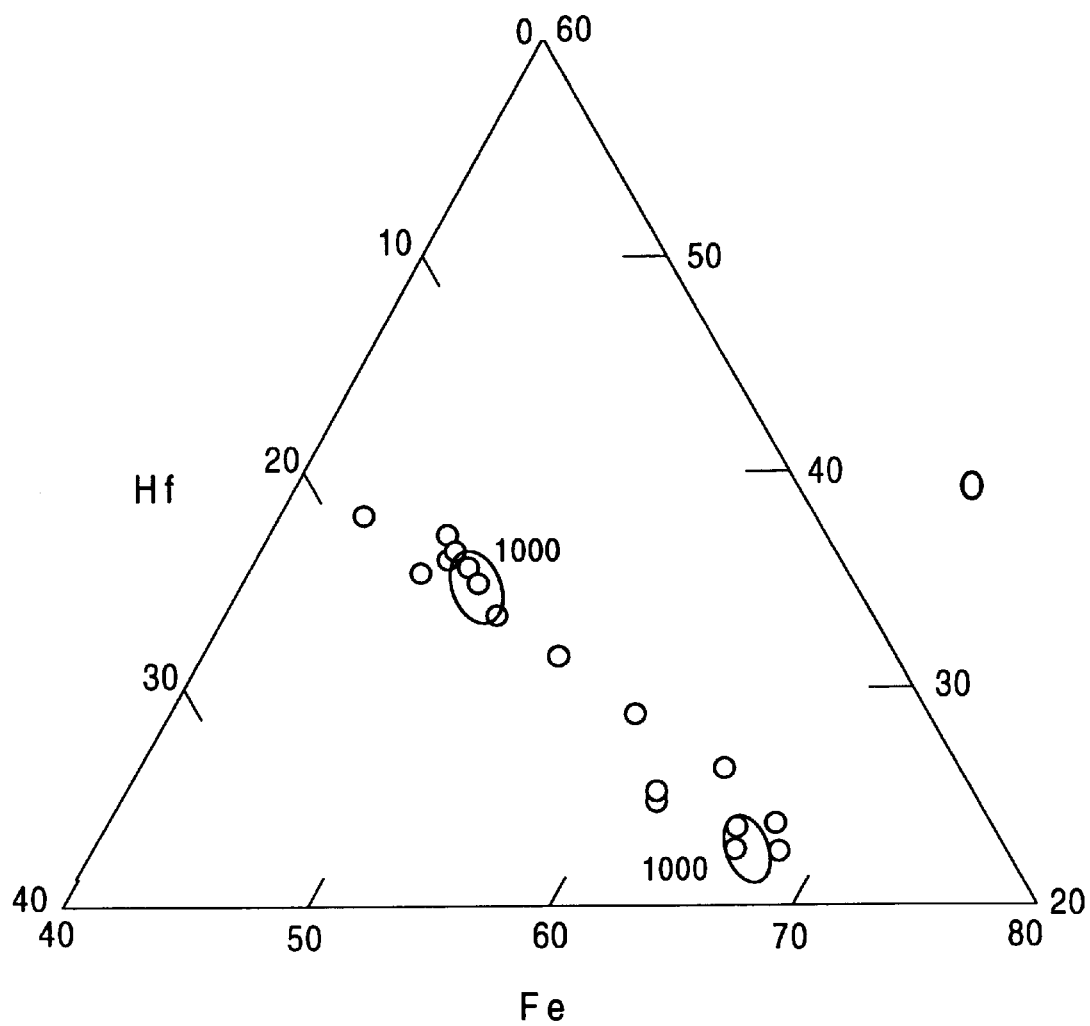
FIG. 6 is a ternary view showing the composition dependency of a magnetic permeability in the Fe—Hf—O film.

Next, the magnetic permeability μ' of the respective specimens is shown in a ternary view based on the result of Table 2. FIG. 6 shows the result of it.

As shown in FIG. 6, it can be found that the values of the magnetic permeability μ' which are 1000 or higher are concentrated within the range in which the composition ratio of Fe is about 65–69 (at %) and the composition ratio of O is about 22–24 (at %) and within the range in which the composition ratio of Fe is about 47–50 (at %) and the composition ratio of is about 32–37 (at %).

Next, the saturation magnetism Is will be described.

As shown in FIG. 2, it can be found that when the number of the chips of HfO$_2$ is the same, an increase in the number of the chips of Fe$_3$O$_4$ decreases the composition ratio of Fe to thereby decrease the saturation magnetism Is.

Figure 7:
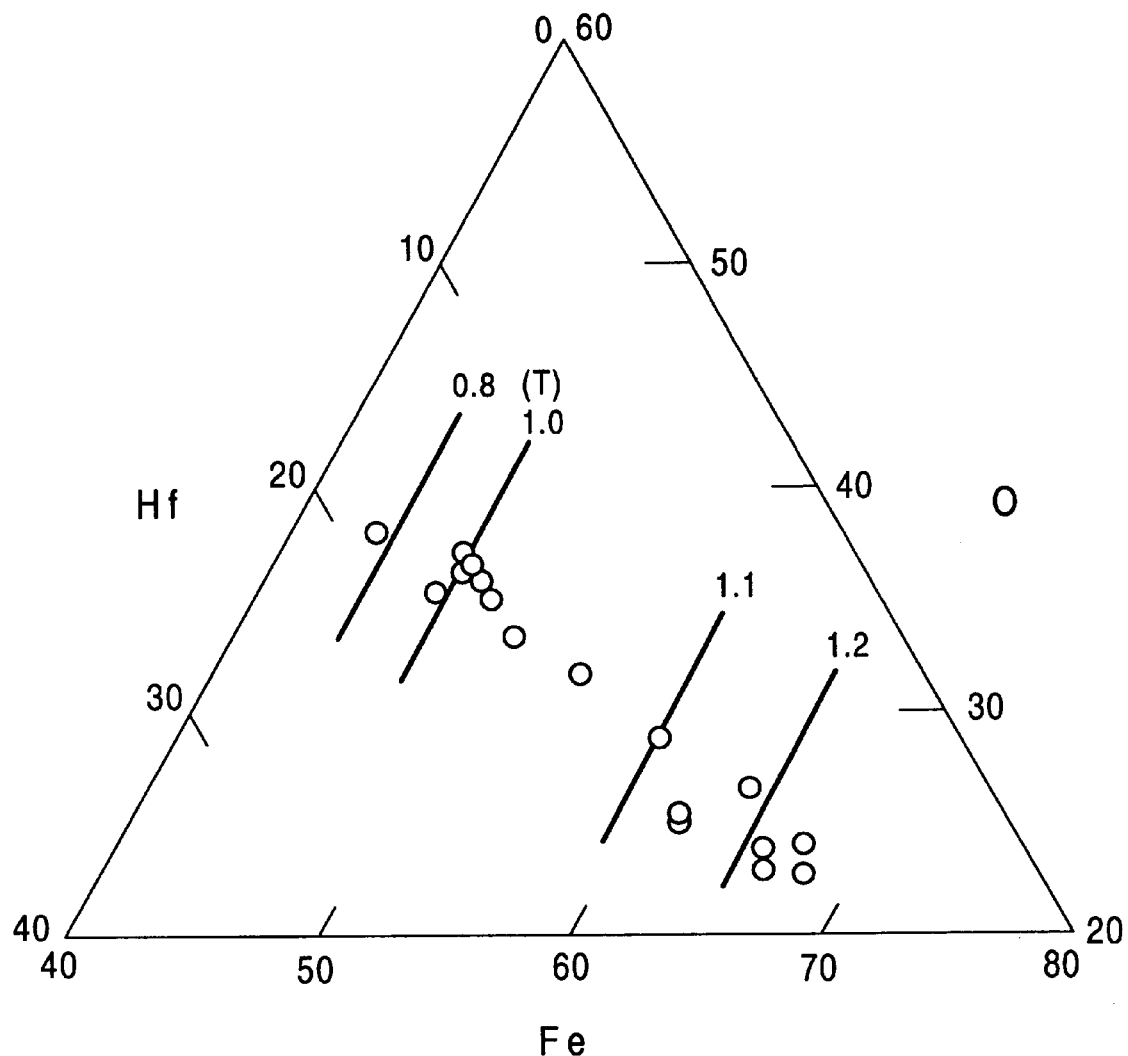
FIG. 7 is a ternary view showing the composition dependency of a saturation flux density in the Fe—Hf—O film.

The saturation magnetism Is of the respective specimens is shown in a ternary view based on the result of Table 2. FIG. 7 shows the result.

As shown in FIG. 7, the saturation magnetism of 0.8 T or more can be obtained when the composition ratio of Fe is 45 at % or more and the saturation magnetism of 1.0 T or more can be obtained when the composition ratio of Fe is 50 at % or more.

From the result of the above experiment, in the Fe—(Zr, Hf)—O alloy magnetic film, the specific resistance ρ is increased by an increase in the composition ratio of O (a decrease in the composition ratio of Fe), whereas the saturation magnetism Is is increased by an increase in the composition ratio of Fe (a decrease in the composition ratio of O). Therefore, to obtain a high saturation magnetism and excellent soft magnetic characteristics at the same time, the composition ratio of Fe is 45–70 at % and preferably 50–60 at %.

That is, it is preferable that both O and Fe have a large composition ratio to form a magnetic film which satisfies the two magnetic characteristics of the specific resistance ρ and the saturation magnetism Is at the same time.

As shown in Tables 1 and 2, although the composition ratio of O is increased by an increase in the number of the chips of Fe$_3$O$_4$ and the number of the chips of ZrO$_2$ (or HfO$_2$) which contain oxygen, the composition ratio of Fe is decreased on the contrary. However, the composition ratio of Fe greatly depends on an increase or a decrease in the number of the chips of Zro$_2$ (or HfO$_2$) which do not contain Fe, and there is a tendency that the composition ratio of Fe is lowered by an increase in the number of the chips of Zro$_2$ (or HfO$_2$) rather than an increase in the number of the chips of Fe$_3$O$_4$.

Accordingly, when the number of the chips of ZrO$_2$ (or HfO$_2$) is properly set and then the composition ratio of O is set within a proper range by the number of the chips of Fe$_3$O$_4$ in order not to greatly lower the composition ratio of Fe, a Fe—Hf—O film and a Fe—Zr—O film having a more preferable composition ratio can be formed.

That is, it is possible to form the magnetic film 11 in which the composition ratios of Fe and O are set within proper ranges and both the specific resistance ρ and the saturation magnetism Is are increased by properly adjusting the number of the chips 13 formed of $Fe_3O_4$ and the number of the chips 14 formed of $ZrO_2$ (or $HfO_2$), in other words, by properly adjusting the area ratios of the chips 13, 14 and the target 12 which is formed of Fe.

In particular, the excellent soft magnetic characteristics are such that the specific resistance ρ (after annealing) is 400 (μΩ·cm) or more, the saturation magnetism Is is 1.0 (T) or more and the magnetic permeability μ' is 1000 or more.

A Fe—Zr—O film having the above magnetic characteristics corresponds to the specimen No. 7 in Table 1. Further, it can be found that the specimen No. 6 exhibits high values as to the magnetic permeability μ' and the saturation magnetism Is although the specific resistance ρthereof (after annealing) is somewhat smaller than 400 (μΩ·cm).

The specimens Nos. 9, 10, 11, 12 and 13 correspond to the Fe—Hf—O film having the above magnetic characteristics in Table 2. In addition, the specimens Nos. 7, 14, 15 and 18 also approximately satisfy the above magnetic characteristics.

In the above experiment, although $Fe_3O_4$ was used for the chips 13 composed of an oxide of Fe which was used to form the Fe—Hf—O film and the Fe—Zr—O film, oxide of iron other than $Fe_3O_4$, such as, for example, FeO and $Fe_2O_3$ may be used.

Figure 8:
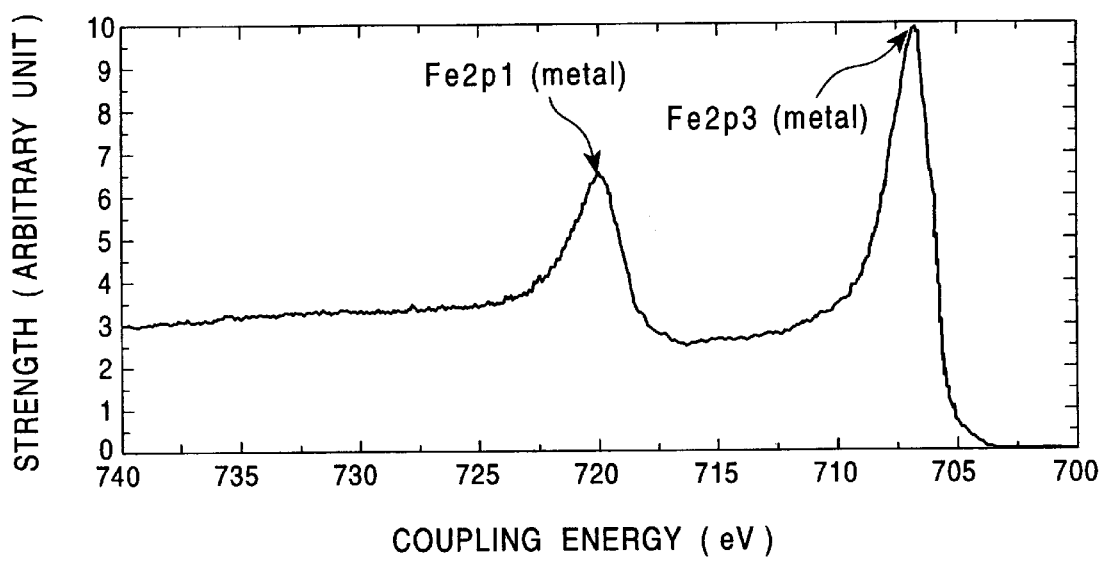
FIG. 8 is a chart showing the bonded state of Fe in the Fe—Hf—O film as analyzed by XPS.
Figure 9:
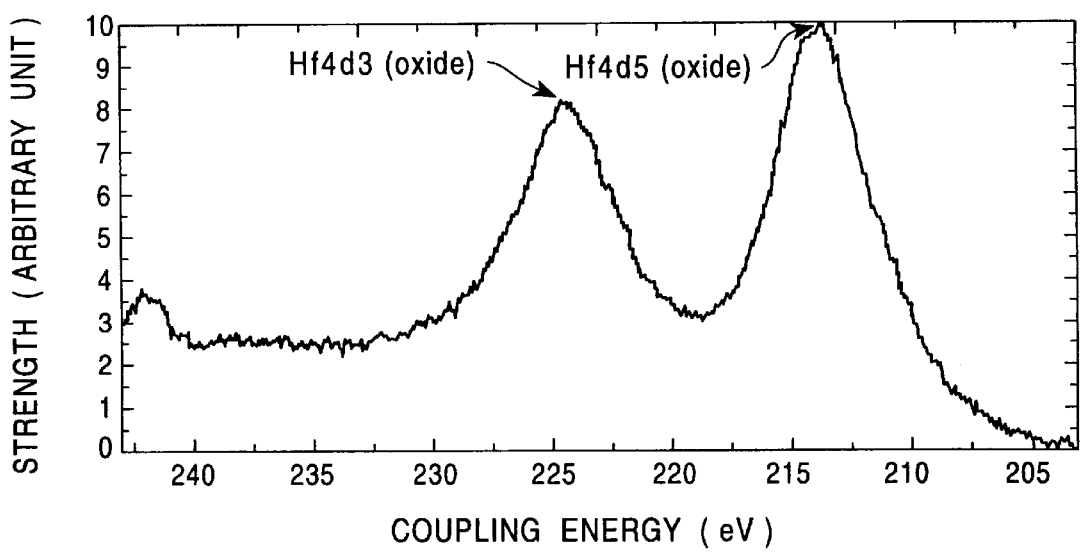
FIG. 9 is a chart showing the bonded state of Hf in the Fe—Hf—O film as analyzed by XPS.

FIG. 8 and FIG. 9 show the result of the experiment which analyzed how Fe was bonded to Hf in the Fe—Hf—O film with an XPS (X-ray photoelectron spectroscopy).

It can be found that Fe exists as Fe in a metal state in FIG. 8 and Hf exists as oxide in FIG. 9.

More specifically, an oxide of Fe is decomposed and separated to Fe and O in sputtering and acts as a source for supplying oxygen into the film. Therefore, FeO and $Fe_2O_3$ may be used as the target of an oxide of Fe.

Figure 10:
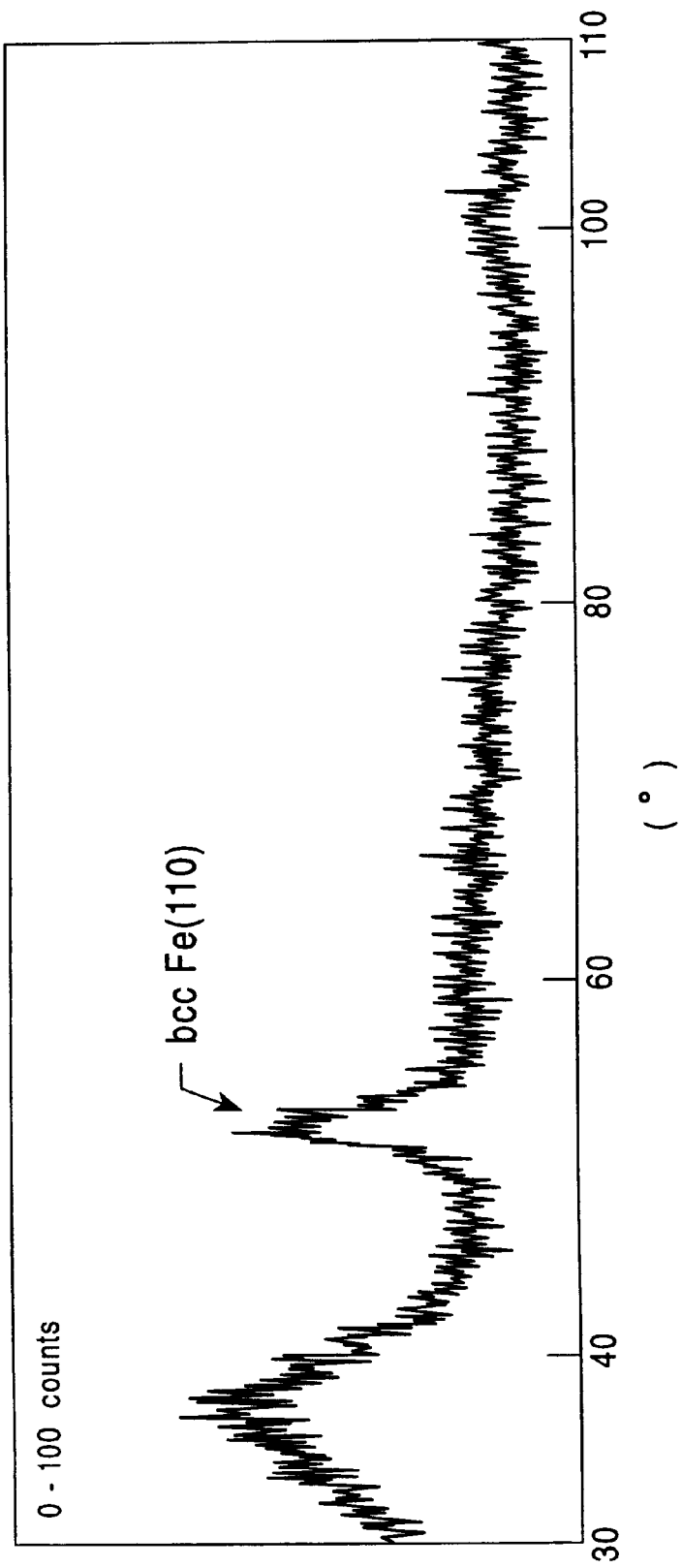
FIG. 10 shows a result of an experiment in which the film structure of the Fe—Hf—O film was analyzed by an XRD method.

FIG. 10 shows the result of the experiment for analyzing the film structure of the Fe—Hf—O film of the specimen 12 in Table 2 by an XRD method (X-ray diffraction method).

In the case of FIG. 10, a diffraction peak appears in the vicinity of about 52° and this is an X-ray diffraction image on the (110) plane of bcc Fe. Further, a broad diffraction pattern appears in addition to the Fe (110) diffraction peak in FIG. 10. It can be conceived from the result of the experiment that the film structure of the specimen No. 12 is composed of two regions, one of them or the broad diffraction pattern is an amorphous phase composed of oxide containing large amounts of Hf and oxygen and the other of the regions is a fine crystal phase composed of bcc Fe.

Figure 11:
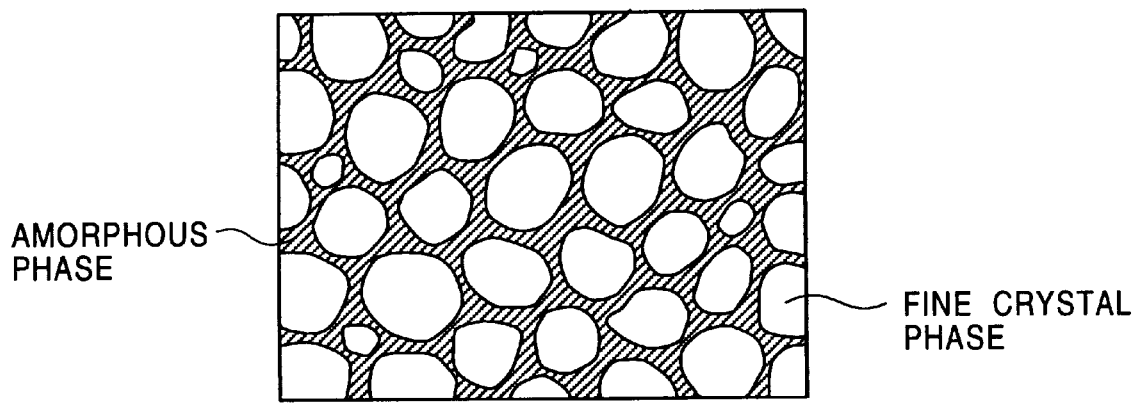
FIG. 11 is a schematic view showing the structures of the Fe—Hf—O film and the Fe—Zr—O film.

Therefore, as schematically shown in FIG. 11, it can be conceived that the Fe—Hf—O film and the Fe—Zr—O film have such a film structure that the fine crystal phase is mixed with the amorphous phase which contains an oxide of Hf or Zr in a large amount. Further, it can be found in FIG. 10 that the average grain size of the fine crystal phase which is determined from the half-width of the Fe (110) diffraction peak using Sierra's formula is about 5 nm. Therefore, the average crystal size of the fine crystal phase can be set to 30 nm or less.

As described above, according to the magnetic film manufacturing method of the invention of the original application, a magnetic film which has a film structure similar to that of the magnetic film which has been succeeded in the conventional reactive sputtering can be formed.

Figure 12:
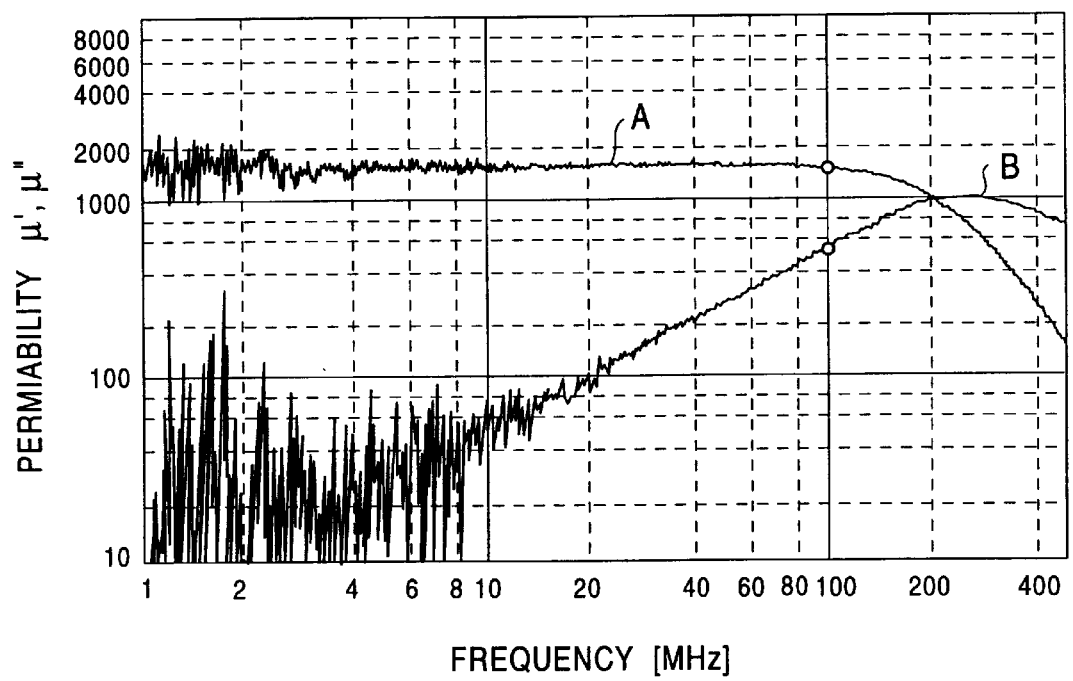
FIG. 12 is a graph showing the relationship between the frequency and the magnetic permeability of the Fe—Hf—O film.

Next, FIG. 12 shows the result of the experiment of the frequency dependency of the specimen 12 in Table 2. A curve (A) shows a magnetic permeability μ' (the value of the real part of complex magnetic permeability) and a curve (B) shows a magnetic permeability μ" (the value of the imaginary part of the complex magnetic permeability).

In FIG. 12, it can be found that the value of μ' shows an approximately flat constant value up to 100 MHz and that excellent high frequency characteristics can be obtained. In general, although the value of μ' of several MHz is large in the soft magnetic film, since ρ is small, the value of μ' is lowered by the loss due to an eddy current as a frequency increases. Whereas, since the soft magnetic film obtained by the magnetic film manufacturing method of the present invention has the amorphous structure containing the large amount of O, the value of ρ is high, the value of μ" which exhibits a loss does not increase even in a high frequency region (the curve (B)) and the value of μ' is constant up to about 100 MHz, whereby a high magnetic permeability can be obtained in a high frequency region as compared with an ordinary material.

Next, an embodiment of the present invention will be described.

Figure 13:
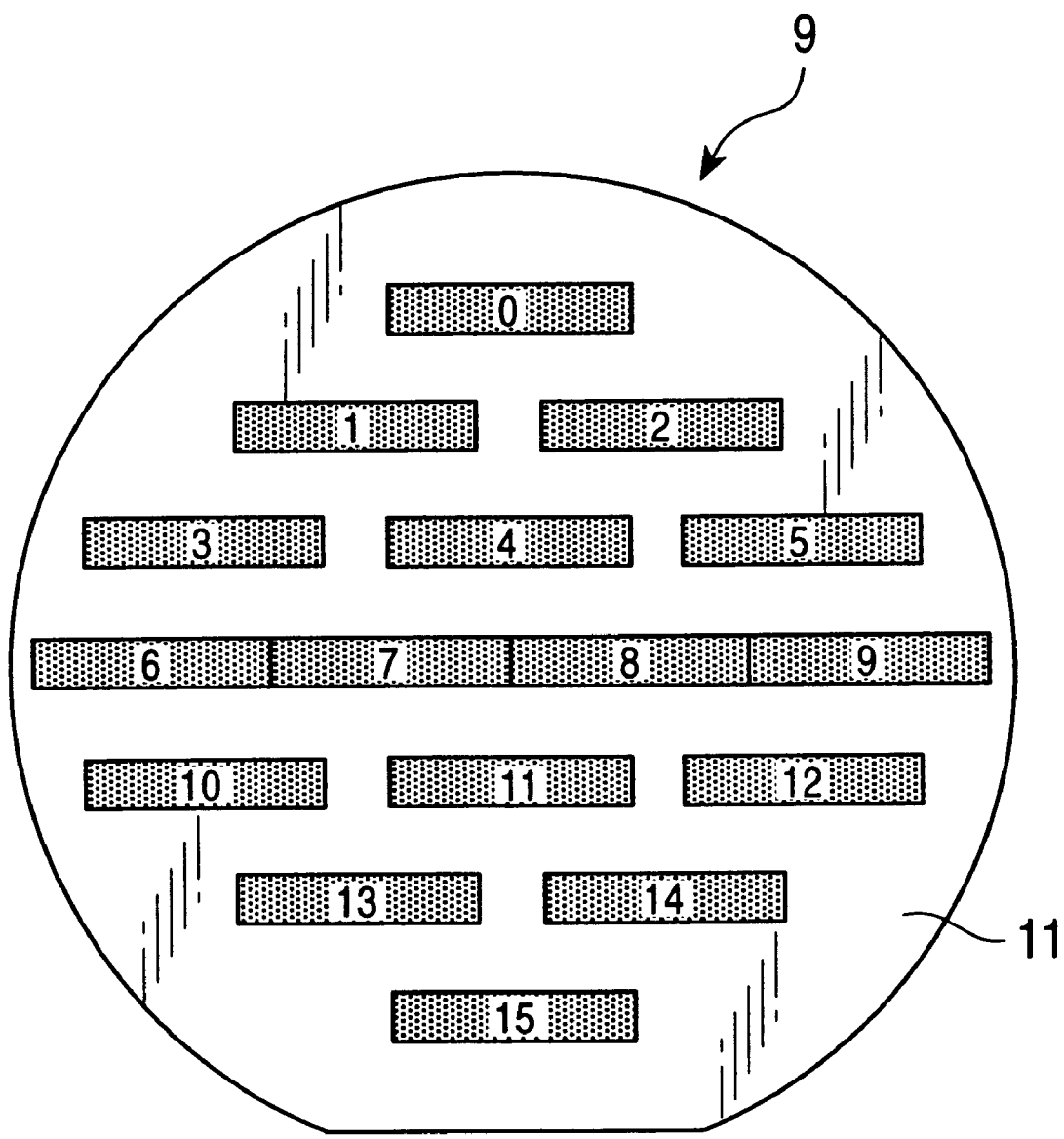
FIG. 13 is a view explaining the measuring points of film thicknesses and specific resistances on a film forming substrate.

16 pieces of chips 13 each formed of $Fe_3O_4$ and 32 pieces of chips 14 each composed of $ZrO_2$ were disposed on a target 12 formed of Fe, and a magnetic film was formed on a substrate as shown in FIG. 13. Film thicknesses and specific resistances were measured at 16 measuring points on the substrate of FIG. 13. Note that the film thicknesses were measured by a stylus-contact-type thickness measuring method and the specific resistances were measured with a 4-terminal resistance meter.

As a result of measurement, it was found that the film thicknesses and the specific resistances were varied by at least 20% with respect to the average values thereof. That is, it was found that there was a possibility that the film thicknesses and characteristics were different depending upon the locations on a substrate surface.

To cope with the above problem, in the embodiment of the present invention, a sintered target 20 was made by mixing powder formed of Fe, powder formed of $Fe_3O_4$ and powder formed of $ZrO_2$ and sintering the thus mixed powders.

Figure 14:
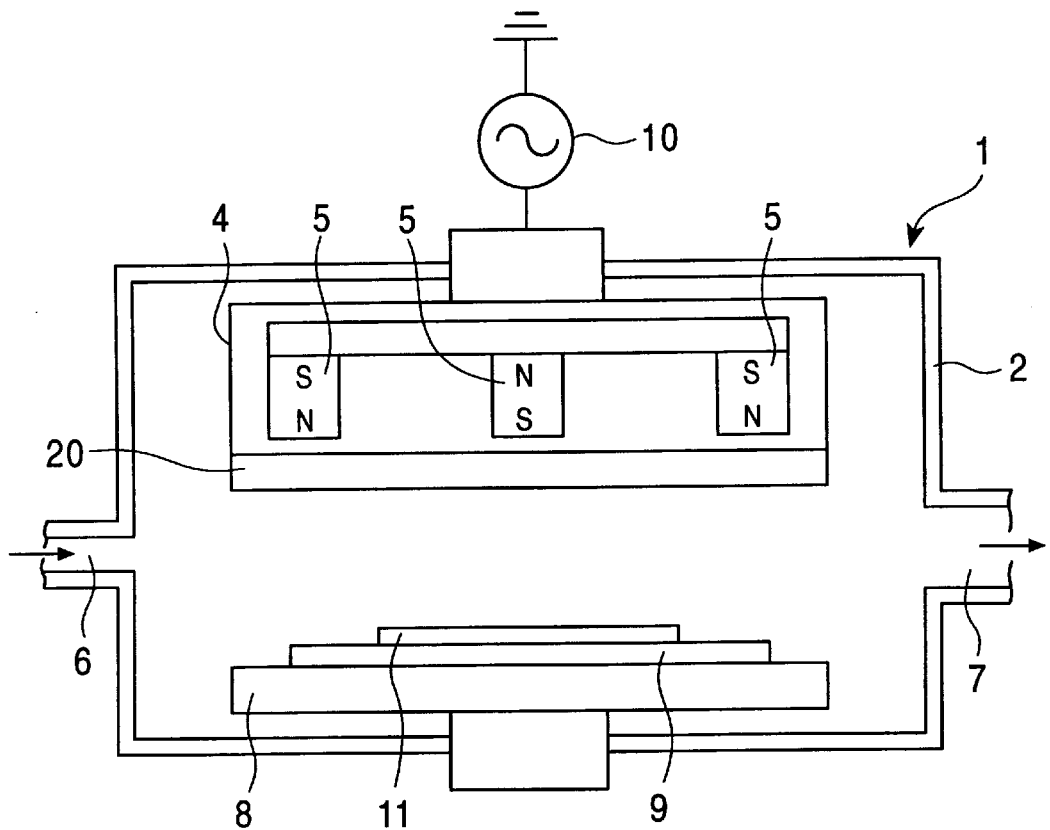
FIG. 14 is an arrangement view showing the inner structure of a magnetron sputtering apparatus.
Figure 15:
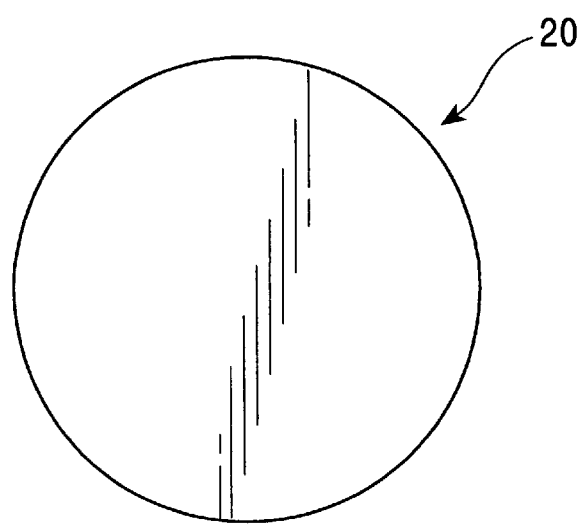
FIG. 15 is a front elevational view showing an embodiment of a sintered target of the present invention.

FIG. 14 is an arrangement view showing the inner structure of a magnetron sputtering apparatus, and FIG. 15 is a front elevational view showing an embodiment of the sintered target of the present invention used in a film forming apparatus. As shown in FIG. 14, the magnetron sputtering apparatus 1 includes an electrode unit 4 and a substrate holder 8 disposed in the chamber 2 thereof. The electrode unit 4 is used to mount the sintering target 20 thereon, and the substrate holder 8 is located at a position confronting the sintering target 20. A substrate 9 is disposed on the substrate holder 8.

Next, the magnetic film 11 was formed on the substrate 9 as shown in FIG. 13 using the sintering target 20. The composition of the thus formed Fe—Zr—O film was analyzed with an EPMA and it was found that Fe: 51.4, Zr: 14.1 and O: 34.5.

When the structure of the thus formed magnetic film 11 was analyzed by an XRD method (X-ray diffraction method), it was found that the magnetic film 11 was composed of two regions similarly to FIG. 10, that is, one of the regions was an amorphous phase composed of oxide containing Zr and oxygen in large amounts and the other of the regions was a fine crystal phase composed of bcc Fe.

Accordingly, it was found that the magnetic film formed by the manufacturing method of the embodiment of the present invention had the same structure as that of the magnetic film formed by a conventional reactive sputtering. Further, as schematically shown in FIG. 11, it was contemplated that the Fe—Zr—O film had a film structure in which the fine crystal phase was mixed with the amorphous phase containing oxide of Zr in a large amount, and it was found that the fine crystal phase had an average grain size of 30 nm or less.

Next, the film thicknesses and specific resistances of the magnetic film was measured at the 16 measuring points on the substrate of FIG. 13. Table 3 shows the result of measurement.

The magnetic film formed by the manufacturing method of the embodiment of the present invention has an average film thickness of 2.9 $\mu$m. Thus, it can be found that the magnetic film forming method using the above sintering target is excellent in film thickness controllability. Further, the distribution of the film thicknesses on the substrate surface is within 10% of the average value thereof and the variation of the film thicknesses can be improved thereby.

Furthermore, the specific resistance as one of the characteristics of the magnetic film formed by the manufacturing method of the embodiment of the present invention exhibits an average value of 1042 $\mu\Omega\cdot$cm, from which it can be found that the magnetic film is excellent in high frequency characteristic. As shown in FIG. 15, the distribution of the specific resistances of the magnetic film formed by the manufacturing method of the embodiment of the present invention on the substrate surface is within 5% to the average value, from which it can be found that the distribution of the specific resistances is more stable than that of the film thicknesses on the substrate surface.

In addition, as the other average characteristics of the magnetic film formed with the above sintering target, magnetic permeability $\mu'$ was 883.

It can be found that the magnetic film manufacturing method of the present invention is excellent in the film thickness controllability with out the deviation of a composition due to the difference of densities of local oxygen partial pressures, which is liable to be caused in the magnetic film formed by the conventional reactive sputtering, and without the variation of characteristics accompanied by the deviation of the composition.

TABLE 3

| No. | Film thickness ($\mu$m) | Specific resistance ($\mu\Omega \cdot$ cm) |
| --- | --- | --- |
| 1 | 2.64 | 1023 |
| 2 | 2.74 | 1048 |
| 3 | 2.82 | 1034 |
| 4 | 2.80 | 1048 |
| 5 | 3.00 | 1035 |
| 6 | 2.91 | 1086 |
| 7 | 2.74 | 1059 |
| 8 | 3.05 | 1079 |
| 9 | 3.07 | 1040 |
| 10 | 2.89 | 1066 |
| 11 | 2.88 | 1029 |
| 12 | 3.06 | 1054 |
| 13 | 2.99 | 1052 |
| 14 | 2.97 | 995 |
| 15 | 2.98 | 1045 |
| 16 | 2.87 | 988 |
| Average | 2.90 | 1042 |
| Max. value | 3.07 | 1086 |
| Min. value | 2.64 | 988 |

What is claimed is:

1. A magnetic film forming method, comprising:
    a step of preparing a material A formed of oxide of an element T of at least one kind of Fe, Co, and Ni, a material B formed of oxide of an element M of at least one kind selected from Ti, Zr, Hf, Nb, Ta, Cr, Mo, Si, P, C, W, B, Al, Ga, Ge, and rare earth elements and a material C formed of an element S of at least one kind of Fe, Co, and Ni;
    a target making step of making a target by sintering the powders of the material A, the material B and the material C;
    a disposing step of disposing the target in a film forming apparatus so that the target confronts a substrate; and
    a film forming step of forming a magnetic film on the substrate.

2. A magnetic film forming method according to claim 1, comprising a magnetic film composition ratio adjusting step, wherein the composition ratio of the magnetic film is controlled by making the target by adjusting the ratios of the material A, the material B, and the material C and sintering them.

3. A magnetic film forming method according to claim 2, comprising a magnetic film composition ratio adjusting step, wherein the composition ratio of the magnetic film is controlled by adjusting electric power imposed on the target.

4. A magnetic film forming method according to claim 2, wherein the magnetic film is formed in an Ar atmosphere at the film forming step.

5. A magnetic film forming method according to claim 2, wherein the film structure of the magnetic film having been formed is such that at least one kind of elements selected from Ti, Zr, Hf, Nb, Ta, Cr, Mo, Si, P, C, W, B, Al, Ga, Ge, and rare earth elements, amorphous in which oxygen is contained, and a fine crystal phase mainly comprising at least one kind of elements of Fe, Co, and Ni exist in the magnetic film in a mixed state.

6. A magnetic film forming method according to claim 5, wherein the fine crystal phase further contains the oxide of the element M.

7. A magnetic film forming method according to claim 6, wherein the fine crystal phase has an average grain size of 30 nm or less.

8. A magnetic film forming method according to claim 5, wherein the crystal structure of the fine crystal phase mainly comprises the bcc structure.

9. A magnetic film forming method according to claim 5, wherein the crystal structure of the fine crystal phase comprises the mixed structure of at least one kind of a bcc structure, a hcp structure and an fcc structure.

10. A magnetic film forming method according to claim 1, wherein the magnetic film is formed of the composition of $Fe_aM_bO_c$, where M is at least one kind of elements selected from Ti, Zr, Hf, Nb, Ta, Cr, No, Si, P, C, W, B, Al, Ga, Ge, and rare earth elements and the composition ratios a, b, and c satisfy the relationships of $45 \leq a \leq 70$, $5 \leq b \leq 30$, $10 \leq c \leq 40$, and $a+b+c=100$ in at %.

11. A magnetic film forming method according to claim 1, wherein the magnetic film is formed at the composition ratio of $(Co_{1-d}Q_d)_xM_yO_zX_w$, where Q is an element containing any one or both of Fe and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and d representing the composition ratio satisfies $0 \leq d \leq 0.7$, x, y, z, and w satisfy the relationships of $3 \leq y \leq 30$, $7 \leq z \leq 40$, $0 \leq w \leq 20$, and $20 \leq y+z+w \leq 60$ in at %, and the balance is x.

12. A magnetic film forming method according to claim 11, wherein d representing the composition ratio of the magnetic film satisfies $0 \leq d \leq 0.3$, x, y, z, and w satisfy the relationships of $7 \leq y \leq 15$, $20 \leq z \leq 35$, $0 \leq w \leq 19$, and $30 \leq x+y+z \leq 50$ in at %, and the balance is x.

13. A magnetic film forming method according to claim 11, wherein the element Q is Fe.

14. A magnetic film forming method according to claim 11, wherein the density ratio of Co and Fe is $0.3 \leq \{Co/(Co+Fe)\} \leq 0.8$.

15. A magnetic film forming method according to claim 1, wherein the magnetic film is formed at the composition ratio of $(Fe_{1-e}Co_e)_x M_y O_z X_w$, where Q is an element containing any one or both of Co and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and e representing the composition ratio satisfies $0 \leq e \leq 0.3$, x, y, z, and w satisfy the relationships of $5 \leq y \leq 30$, $10 \leq z \leq 40$, $0 \leq w \leq 20$, and $20 \leq y+z \leq 60$ in at %, and the balance is x.

16. A magnetic film forming method, comprising:
   a step of preparing a material A formed of oxide of an element T of at least one kind of Fe, Co, and Ni and a material B formed of oxide of an element M of at least one kind selected from Ti, Zr, Hf, Nb, Ta, Cr, Mo, Si, P, C, W, B, Al, Ga, Ge, and rare earth elements;
   a target making step of making a target by sintering the powders of the material A and the material B;
   a disposing step of disposing the target in a film forming apparatus so that the target confronts a substrate; and
   a film forming step of forming a magnetic film on the substrate.

17. A magnetic film forming method according to claim 16, comprising a magnetic film composition ratio adjusting step, wherein the composition ratio of the magnetic film is controlled by making the target by adjusting the ratios of the material A and the material B and sintering them.

18. A magnetic film forming method according to claim 16, comprising a magnetic film composition ratio adjusting step, wherein the composition ratio of the magnetic film is controlled by adjusting electric power imposed on the target.

19. A magnetic film forming method according to claim 16, wherein the magnetic film is formed in an Ar atmosphere at the film forming step.

20. A magnetic film forming method according to claim 16, wherein the film structure of the magnetic film having been formed is such that at least one kind of elements selected from Ti, Zr, Hf, Nb, Ta, Cr, Mo, Si, P, C, W, B, Al, Ga, Ge, and rare earth elements, amorphous in which oxygen is contained and a fine crystal phase mainly comprising at least one kind of elements of Fe, Co, and Ni exist in the magnetic film in a mixed state.

21. A magnetic film forming method according to claim 20, wherein the fine crystal phase further contains the oxide of the element M.

22. A magnetic film forming method according to claim 20, wherein the crystal structure of the fine crystal phase comprises the mixed structure of at least one kind of a bcc structure, a hcp structure and an fcc structure.

23. A magnetic film forming method according to claim 20, wherein the crystal structure of the fine crystal phase mainly comprises the bcc structure.

24. A magnetic film forming method according to claim 20, wherein the fine crystal phase has an average grain size of 30 nm or less.

25. A magnetic film forming method according to claim 16, wherein the magnetic film is formed of the composition of $Fe_a M_b O_c$, where M is at least one kind of elements selected from Ti, Zr, Hf, Nb, Ta, Cr, Mo, Si, P, C, W, B, Al, Ga, Ge, and rare earth elements and the composition ratios a, b, and c satisfy the relationships of $45 \leq a \leq 70$, $5 \leq b \leq 30$, $10 \leq c \leq 40$, and $a+b+c=100$ in at %.

26. A magnetic film forming method according to claim 16, wherein the magnetic film is formed at the composition ratio of $(Co_{1-d}Q_d)_x M_y O_z X_w$, where Q is an element containing any one or both of Fe and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and d representing the composition ratio satisfies $0 \leq d \leq 0.7$, x, y, z, and w satisfy the relationships of $3 \leq y \leq 30$, $7 \leq z \leq 40$, $0 \leq w \leq 20$, and $20 \leq y+z+w \leq 60$ in at %, and the balance is x.

27. A magnetic film forming method according to claim 26, wherein d representing the composition ratio of the magnetic film satisfies $0 \leq d \leq 0.3$, x, y, z, and w satisfy the relationships of $7 \leq y \leq 15$, $20 \leq z \leq 35$, $0 \leq w \leq 19$, and $30 \leq x+y+z \leq 50$ in at %, and the balance is x.

28. A magnetic film forming method according to claim 26, wherein the element Q is Fe.

29. A magnetic film forming method according to claim 26, wherein the density ratio of Co and Fe is $0.3 \leq \{Co/(Co+Fe)\} \leq 0.8$.

30. A magnetic film forming method according to claim 16, wherein the magnetic film is formed at the composition ratio of $(Fe_{1-e}Co_e)_x M_y O_z X_w$, where Q is an element containing any one or both of Co and Ni, M is at least one kind of elements selected from Ti, Zr, Hf, Nb, Ta, Cr, Mo, Si, P, C, W, B, Al, Ga, Ge, and rare earth elements, X is at least one kind of elements selected from Au, Ag, Cu, Ru, Rh, Os, Ir, Pt, and Pd, and e representing the composition ratio satisfies $0 \leq e \leq 0.3$, x, y, z, and w satisfy the relationships of $5 \leq y \leq 30$, $10 \leq z \leq 40$, $0 \leq w \leq 20$, and $20 \leq y+z \leq 60$ in at %, and the balance is x.

* * * * *

UNITED STATES PATENT AND TRADEMARK OFFICE
CERTIFICATE OF CORRECTION

PATENT NO. : 6,210,544 B1
DATED : April 3, 2001
INVENTOR(S) : Yoshito Sasaki

Page 1 of 1

It is certified that error appears in the above-identified patent and that said Letters Patent is hereby corrected as shown below:

Claim 10,
Line 4, change "No," to -- Mo, --.

Claim 15,
Line 3, change "$O_2$" to -- $O_z$ --.

Claim 23,
Line 3, change "bec" to -- bcc --.

Signed and Sealed this

Sixth Day of November, 2001

Attest:

NICHOLAS P. GODICI
Attesting Officer
Acting Director of the United States Patent and Trademark Office